United States Patent
Giraudo et al.

(10) Patent No.: US 9,803,893 B2
(45) Date of Patent: Oct. 31, 2017

(54) HOLDER DEVICE FOR FASTENING AN AREA MODULE TO A CARRIER

(71) Applicant: RENUSOL GMBH, Cologne (DE)

(72) Inventors: Francisco Giraudo, Cologne (DE); Heinz Schuld, Cologne (DE)

(73) Assignee: RBI SOLAR, INC., Cincinnati, OH (US)

( * ) Notice: Subject to any disclaimer, the term of this patent is extended or adjusted under 35 U.S.C. 154(b) by 125 days.

(21) Appl. No.: 14/783,013

(22) PCT Filed: Apr. 11, 2014

(86) PCT No.: PCT/EP2014/000975
§ 371 (c)(1),
(2) Date: Oct. 7, 2015

(87) PCT Pub. No.: WO2014/166638
PCT Pub. Date: Oct. 16, 2014

(65) Prior Publication Data
US 2016/0069592 A1   Mar. 10, 2016

(30) Foreign Application Priority Data
Apr. 12, 2013   (EP) .................................... 13001913

(51) Int. Cl.
*F16B 1/00*   (2006.01)
*F24J 2/52*   (2006.01)
(Continued)

(52) U.S. Cl.
CPC ................ *F24J 2/52* (2013.01); *F16B 2/065* (2013.01); *F16B 5/121* (2013.01); *F24J 2/5258* (2013.01);
(Continued)

(58) Field of Classification Search
CPC ........................................................ F24J 2/52
(Continued)

(56) References Cited

U.S. PATENT DOCUMENTS

| 9,175,878 B2 | 11/2015 | Kemmer et al. | |
| 2010/0127142 A1* | 5/2010 | Genschorek | ........... F24J 2/5232 248/222.14 |
| 2011/0079692 A1* | 4/2011 | Li | ........................ F16M 11/105 248/220.21 |

FOREIGN PATENT DOCUMENTS

| DE | 202011001761 U1 | 4/2011 |
| DE | 202011107843 U1 | 11/2011 |

(Continued)

OTHER PUBLICATIONS

International Search Report for PCT/EP2014/000975 (published as WO 2014/166638), 4 pages, dated Jun. 3, 2014.
(Continued)

*Primary Examiner* — Avinash Savani
(74) *Attorney, Agent, or Firm* — Heslin Rothenberg Farley & Mesiti P.C.

(57) ABSTRACT

The present invention concerns a holding device (10) to fasten, especially to clamp, a surface module (20), especially a framed solar panel, on at least one support (30), especially a profile rail, with a head section (12; 112) that is suitable to interact with the surface module (20), a foot section (16; 116) that is suitable for interacting with the support (30) and a connecting element (19) that is suitable for linking the head section (12; 112) with the foot section (16; 116), with the head section (12; 112) being shiftable relative to the foot section (16; 116) along a vertical axis (H) of the holding device (10) by means of the connecting element (19), with the head section (12; 112) being positionable relative to the foot section (16; 116) in at least two angle positions that are twisted towards each other around the vertical axis (H) in
(Continued)

Figure 1:
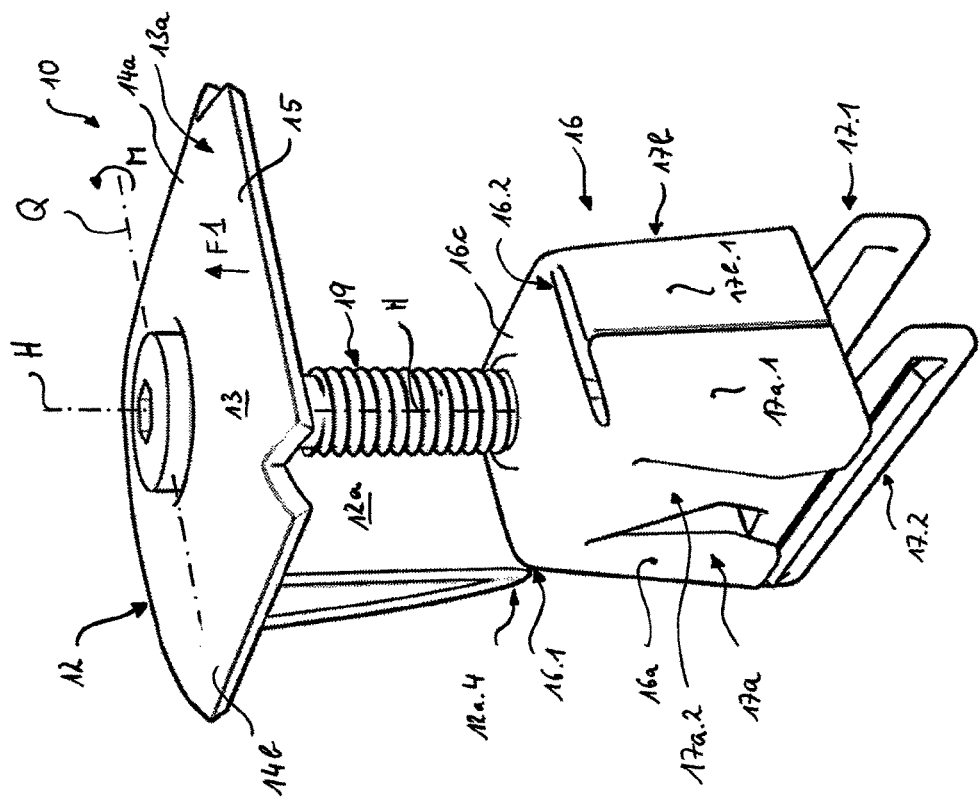

such a way with a pre-determined twisting angle that the head section may be positioned at least in two of the angle positions each on at least one or at least two surface modules, especially with one or several contact sections that are arranged according to the respective angle positions. This allows an installation of surface modules in a simple and flexible way using only a single type of holding device.

19 Claims, 15 Drawing Sheets

(51) Int. Cl.
    *H02S 20/23* (2014.01)
    *H02S 20/20* (2014.01)
    *F16B 2/06* (2006.01)
    *F16B 5/12* (2006.01)

(52) U.S. Cl.
    CPC ............. *F24J 2/5262* (2013.01); *H02S 20/20* (2014.12); *H02S 20/23* (2014.12); *Y02B 10/12* (2013.01); *Y02E 10/47* (2013.01)

(58) Field of Classification Search
    USPC ...................................... 126/704; 248/220.21
    See application file for complete search history.

(56) References Cited

FOREIGN PATENT DOCUMENTS

| | | |
|---|---|---|
| EP | 2029946 A2 | 3/2009 |
| EP | 2090847 A2 | 8/2009 |
| EP | 2309552 A1 | 4/2011 |
| EP | 2410190 A1 | 1/2012 |
| EP | 2495507 A1 | 9/2012 |
| EP | 2662645 A2 | 11/2013 |

OTHER PUBLICATIONS

English Translation of International Search Report for PCT/EP2014/000975 (published as WO 2014/166638), 3 pages, dated Jun. 3, 2014.

\* cited by examiner

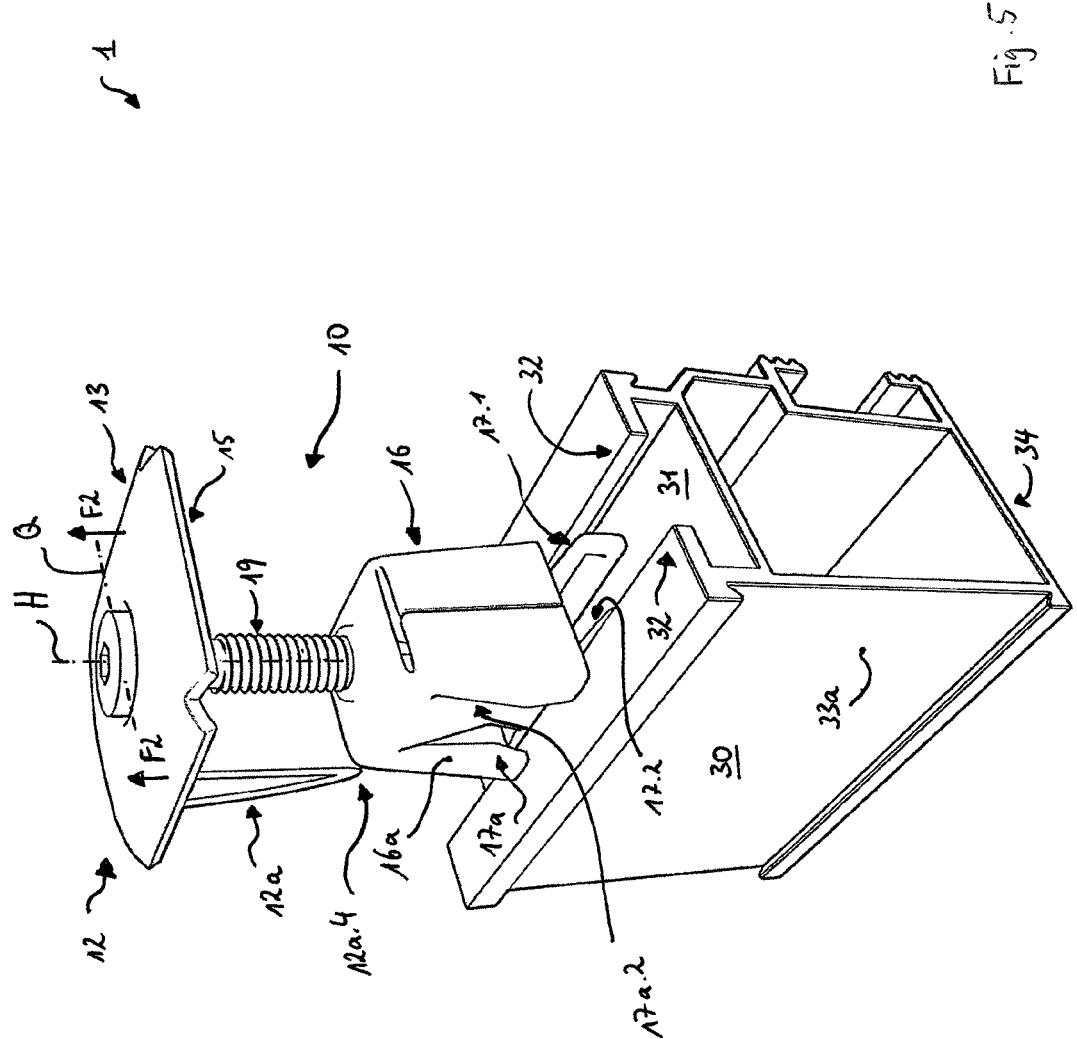

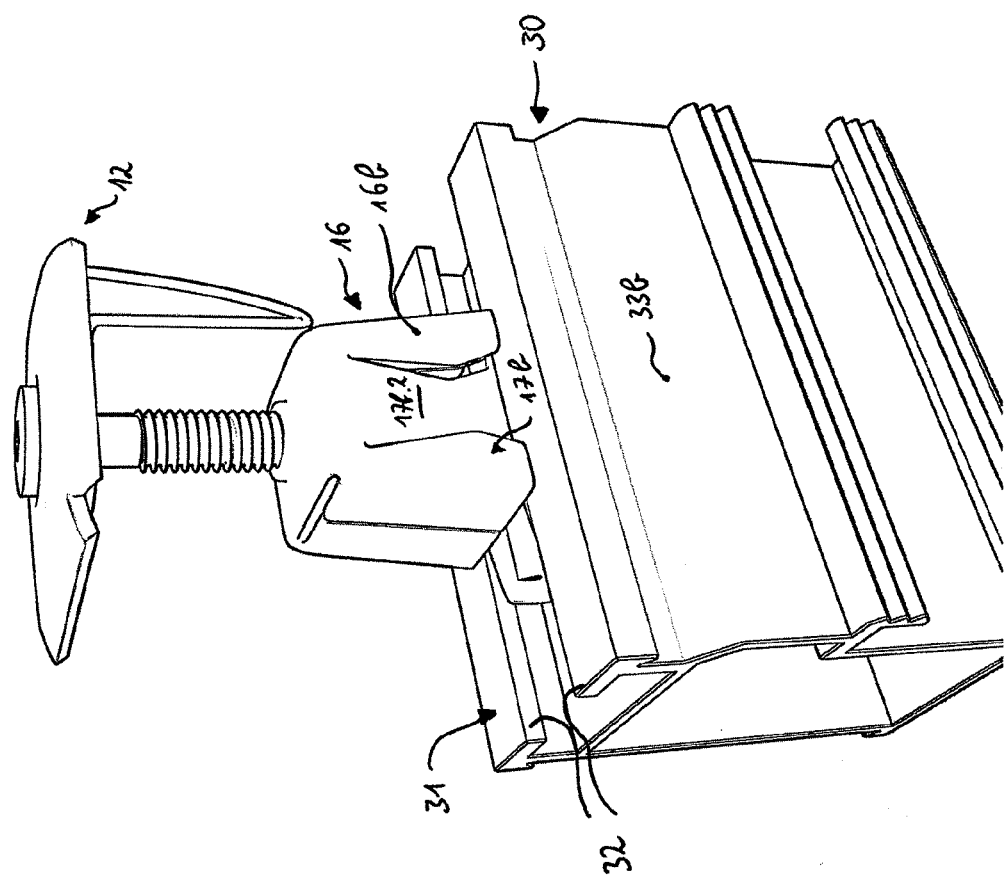

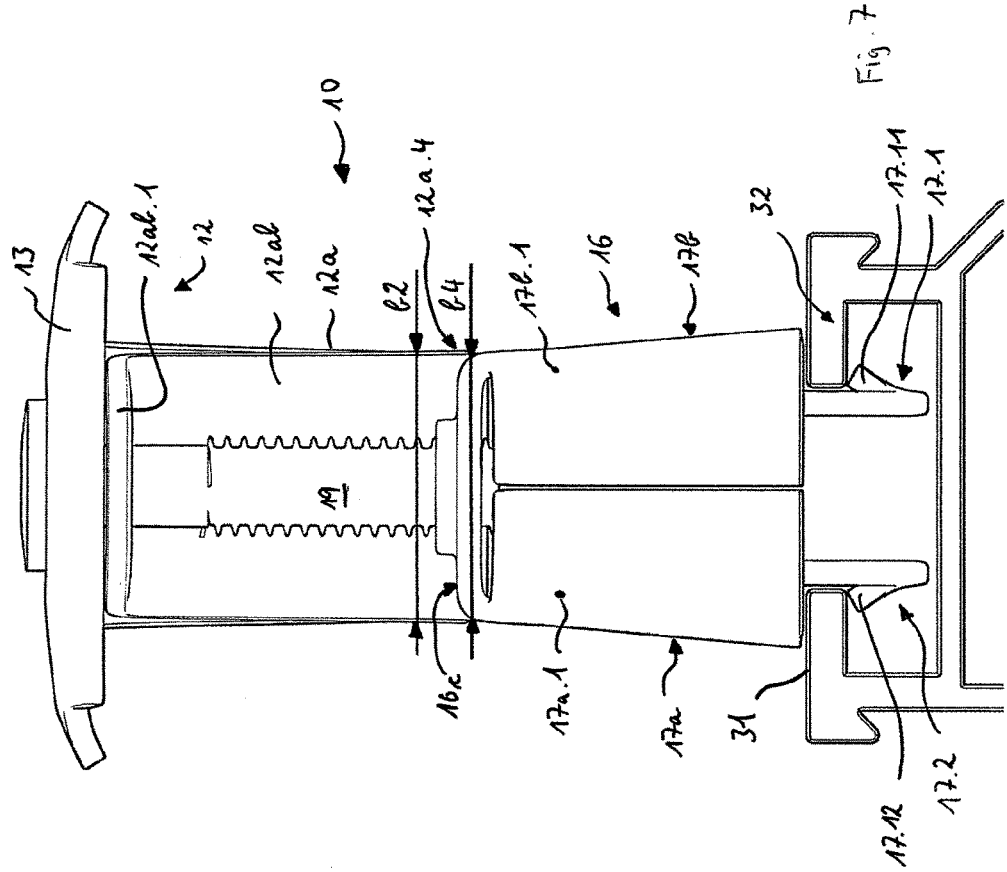

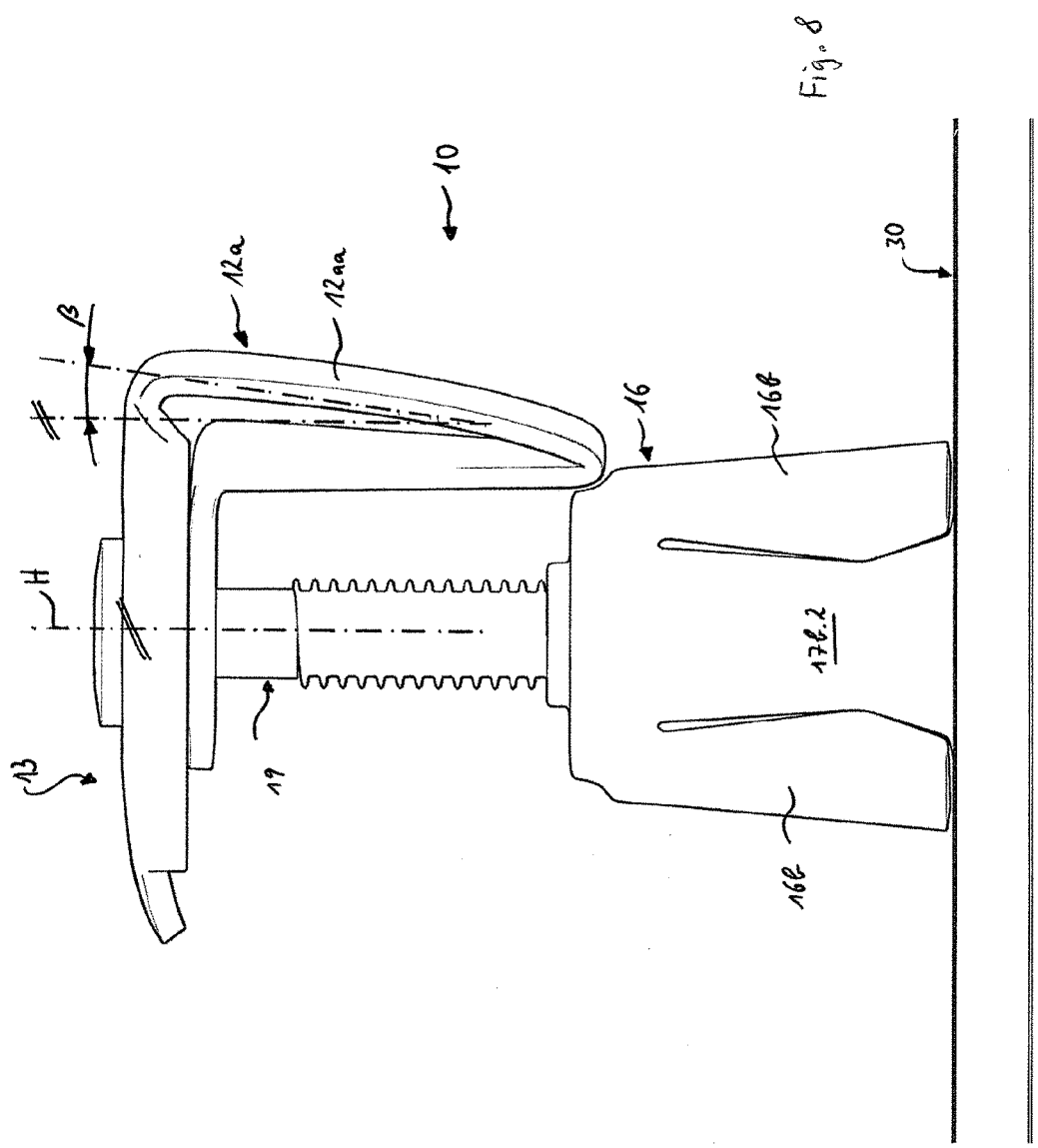

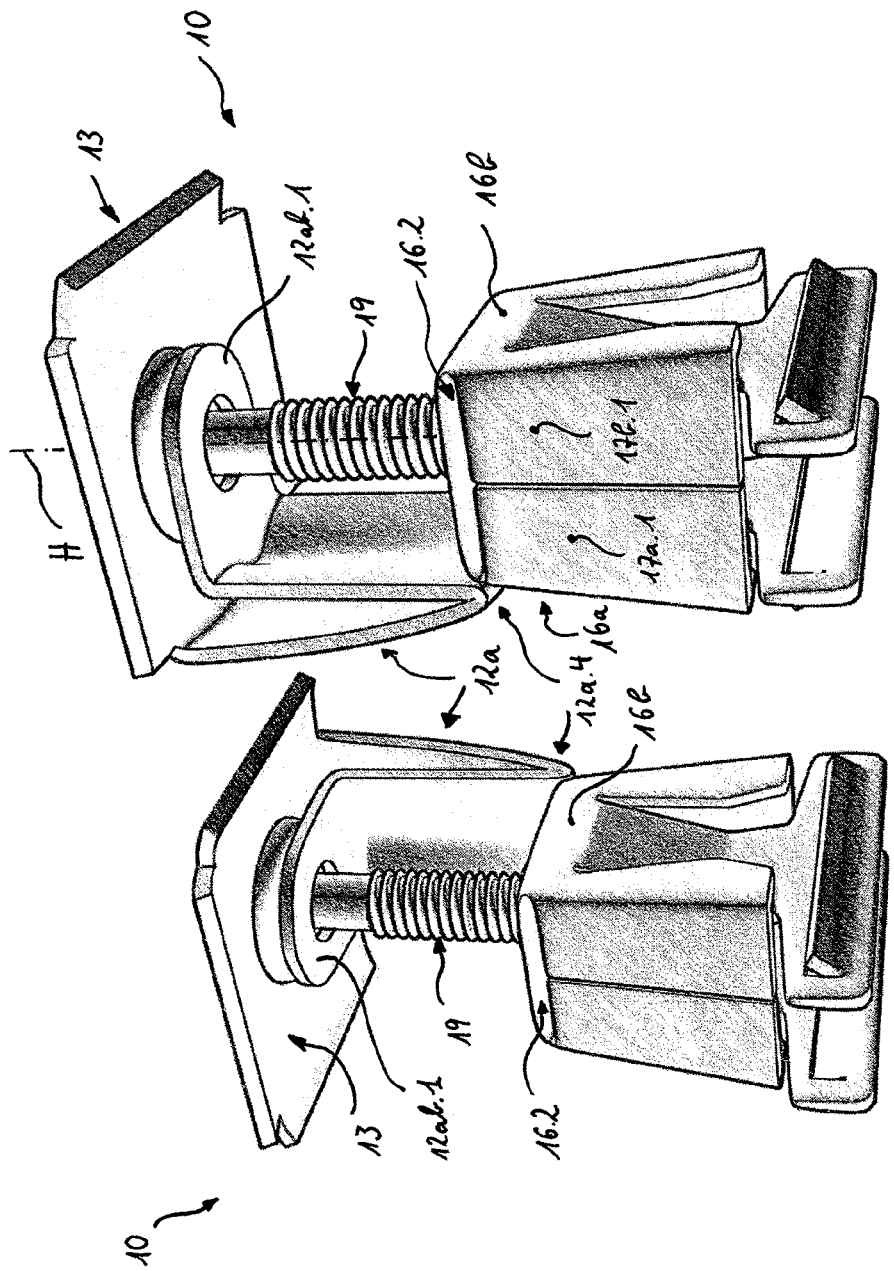

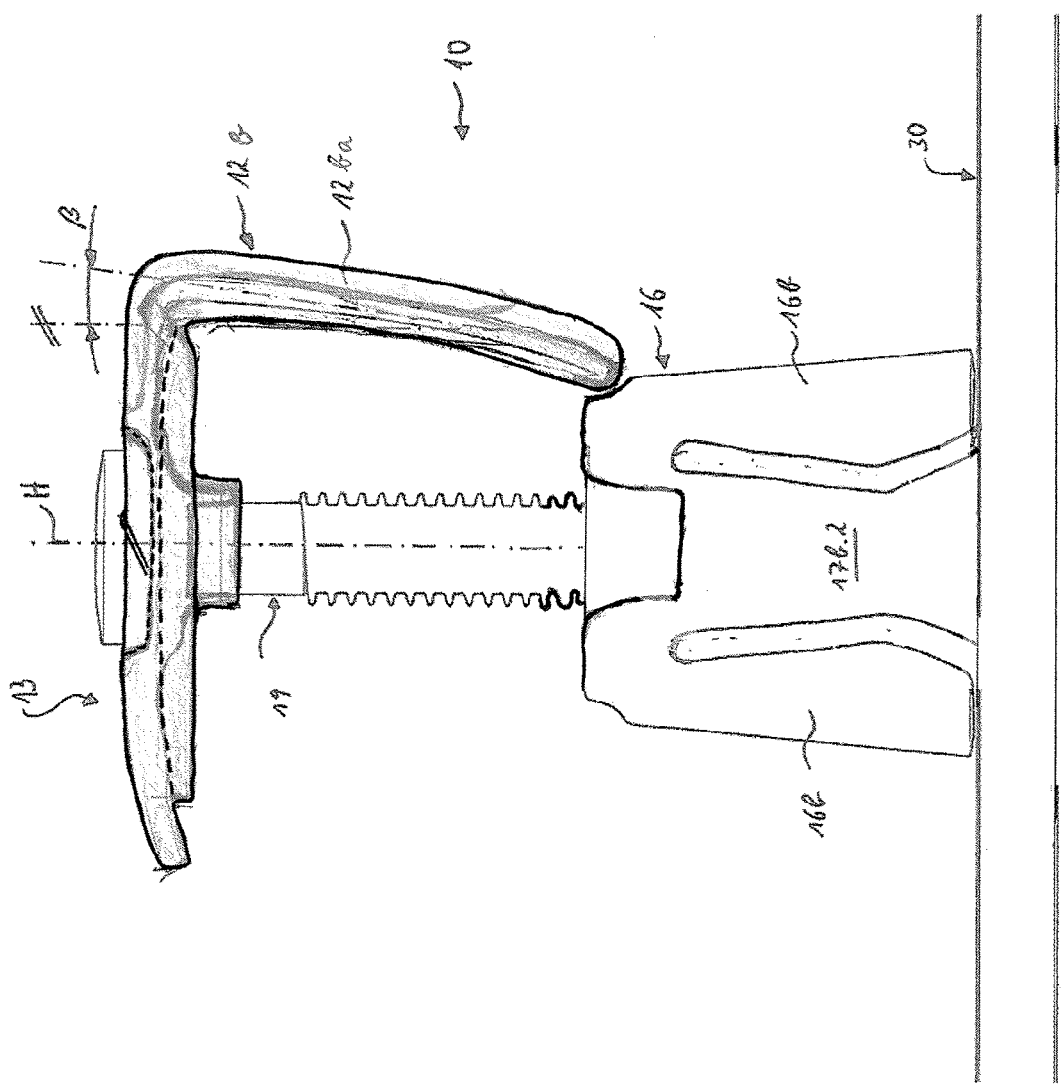

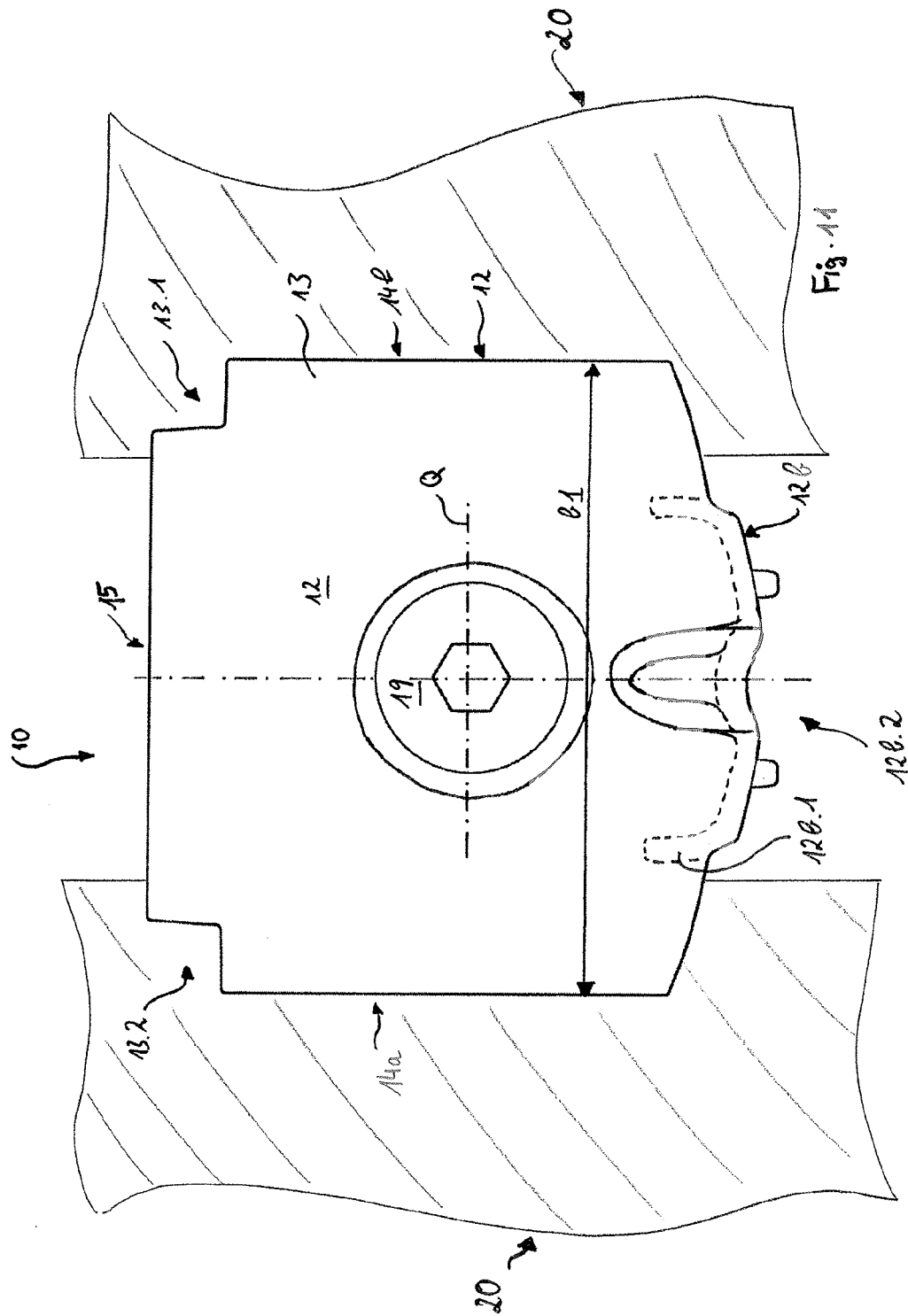

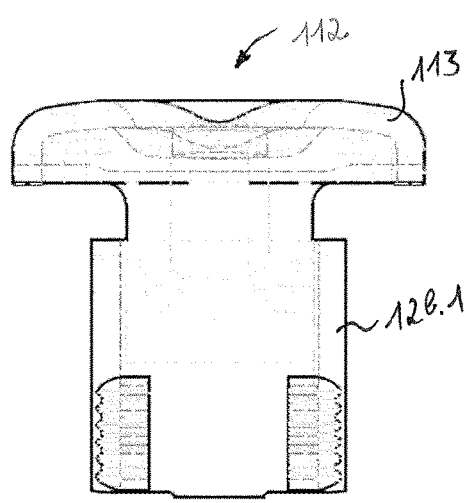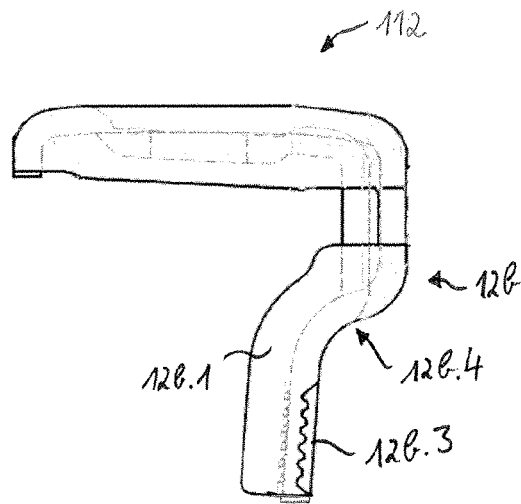
Fig. 12A  Fig. 12B
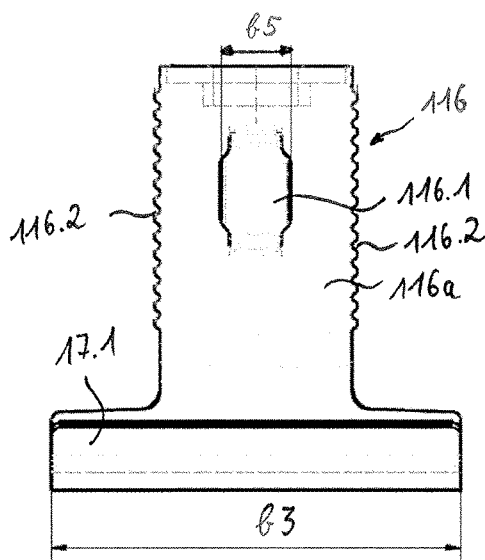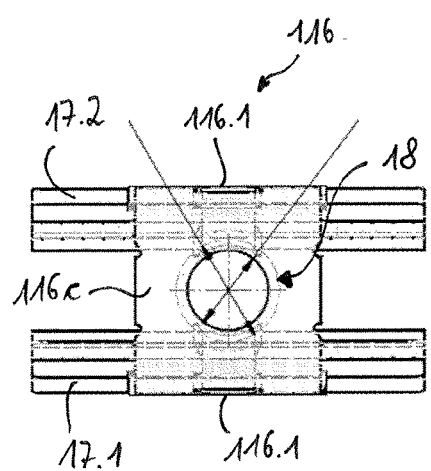
Fig. 13A  Fig. 13B

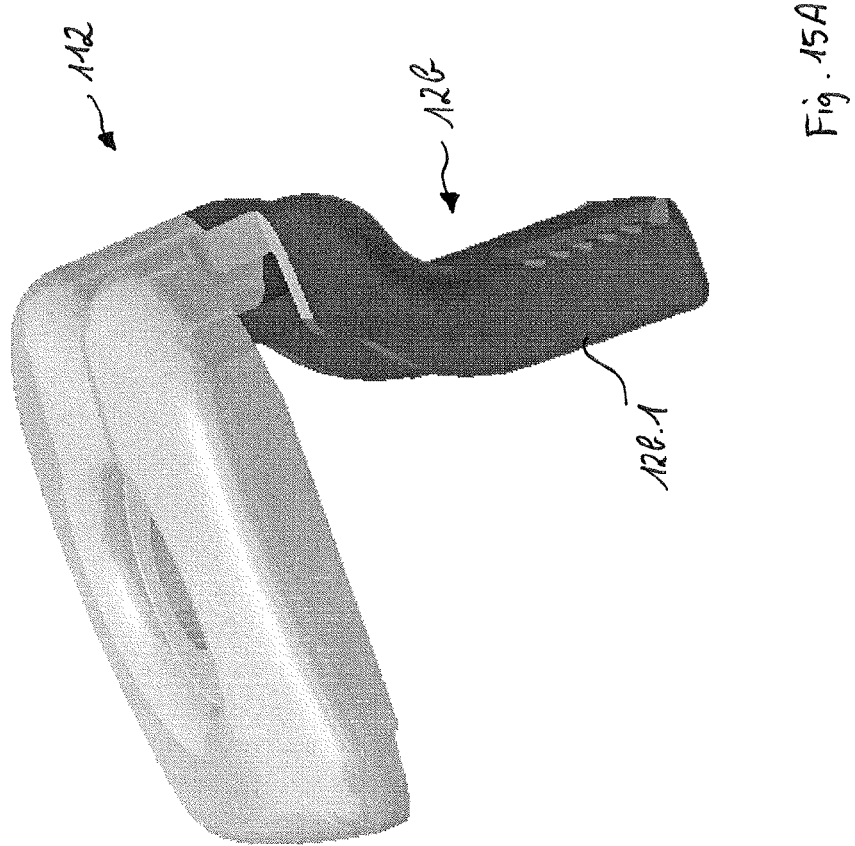

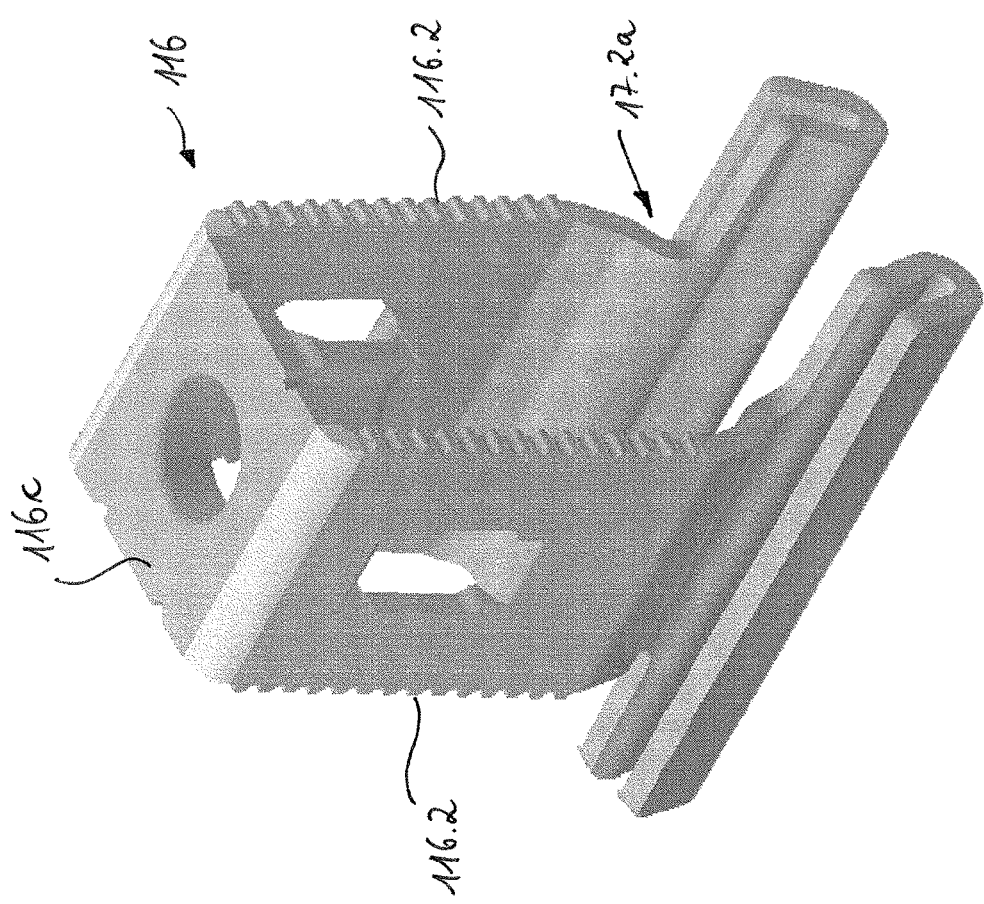

HOLDER DEVICE FOR FASTENING AN AREA MODULE TO A CARRIER

CROSS-REFERENCE TO RELATED APPLICATIONS

This application is a continuation of PCT Application PCT/EP2014/000975, filed Apr. 11, 2014, and published under the PCT Articles as WO 2014/166638 A1 (in German with an English Abstract) on Oct. 16, 2014. PCT/EP2014/000975 claimed priority to German Application No. 13001013.6, filed Apr. 12, 2013. The entire disclosures of PCT/EP2014/000975 and German Application No. 13001013.6 are incorporated herein by reference in their entirety.

The invention concerns a holding device for attaching a surface module on a support according to the general term of claim 1.

When surface modules are assembled, for example solar thermal panels or solar panels, it is desirable to be able to work with holders or brackets with a simple design, since such modules frequently have to be installed on roof slopes or facades that are difficult to access. At the same time, the holder should be able to maintain the module on a carrier with particularly high stability and safely. Finally, it is also very important that a connection between a carrier and a module may be installed in a particularly flexible way, especially without predetermined installation positions, as every facade, every roof and even the modules themselves have specific dimensions. In some cases, profile molding is used for this reason, which allows the holder to be locked into position at any desired position. On the part of the module, in some cases there is also an installation position provided that may be used at any position of the module frame by means of a frictional and/or form-fitted connection.

The patent application EP 2 410 190 A1 shows a securing device that may be used for attaching a first component on a second component by applying a screw to a holding element and a clamping element as well as an expansion element are braced with the holding element using the screw on one of the lower surfaces of one of the components.

The disadvantage of this device is that firstly, a large number of individual elements is required, and secondly, assembly is only possible into pre-determined openings of one of the components. Such openings must be provided on the respective component in a suitable position for each one, which may lead to greater effort required for installation planning.

Frequently, not only one single surface module, e.g. a solar module, is installed on a roof, but instead usually several surface module are attached to a large part of the roof surface in order to be able to use as much of the solar energy radiating onto the rooftop as possible. In this, it is advantageous to attach neighboring surface modules with the same holding device and/or the same holding devices. In other words, the holding devices used between two neighboring surface modules are especially designed to hold two surface modules at the same time. On the edges of the entire planar arrangement, however, different holding devices are used that are specially designed to be used only with one single surface module or only to clip only one single surface module onto the support. The disadvantage of this is that different holding devices must be produced, which in turn increases the unit cost. Furthermore, it is not always easy for the installation worker on the roof to look for and install the correct holding device for each installation point and situation, especially if the roof is a sloping one.

The patent application EP 2 029 946 A1 shows an installation system for attaching a solar module on a support using holding devices that feature each a shaped piece with arms arranged on it, with the arms engaging into corresponding internal longitudinal grooves of the support when installed. The longitudinal grooves are created on the surface in corner areas of the support, and may be subjected to a tensile load, which makes the form-fitted connection with the longitudinal groove self-locking. A respective means of attachment thus may execute a compressive force on a module placed between a head and the support.

The disadvantage of this arrangement is that it requires a special assembly situation, and safe hold of the device on the support can only be ensured after completion of the assembly. Handling is not particularly easy.

Patent application EP 2 090 847 A2 describes a holding device for solar panels for which a first holding piece is guided in a guide bar in a second holding element in such a way that two solar panels may be clamped between the holding piece.

Patent application EP 2 309 552 A1 describes a clamping receptor to attach, e.g. photovoltaic modules, in which a clamping cap is guided in a spaces of a clamping receptor, with an option to clamp two modules between the clamping receptor and the clamping cap on both sides next to the spacer.

The utility model specifications DE 20 2011 107 843 U1 describe an end clamp for framed photovoltaic modules, with a holding limb that may be arranged in various snap-lock positions on a base element.

Patent application EP 2 495 507 A1 describes a holding element for solar module frames with an arch-shaped section that can be braced between the solar module frame and an assembly bar.

The purpose of the invention is to provide a holding device that allows a more flexible installation of surface modules, and is especially more simplified. The holding device preferably consists of a simple structure and usable for an on-site installation situation without any further installation expertise. Furthermore, the holding device preferably should also allow a particularly secure and/or stable connection.

At least one of the purposes stated above is met with a holding device according to claim 1.

The invention starts with a holding device to attach, especially to clamp a surface module, especially a framed solar panel, on at least one support, especially a profile rail, with:
a head section that is arranged to work with a surface module;
a foot section that is arranged to work with the support;
a connecting element that allows a link between the head and the foot section, with the head section being movable with respect to the foot section along a vertical axis of the holding device by means of the connecting element.

The invention provides that the head section may be mounted in at least two angle positions twisted towards each other around the vertical axis in a pre-set (relative) twisting angle in such a way that the head section may be mounted in at least two of the angle positions respectively on at least one or at least two surface modules, especially with one or more contact sections that are arranged according to the respective angle positions. This allows the holding device to be used optionally in different arrangements; especially in order to optionally either only hold and/or brace only one surface module or two surface modules. Only one type of holding device is required, independent of the installation situation. This excludes a wrong installation with an unsuitable holding device. Until several surface modules have been arranged, the installation worker has a free choice of how the surface modules are to be arranged, either relative to the support or relative to each other. This provides a high degree of flexibility and facilitates installation planning and/or work preparation. The head section may be chosen to be arranged and/or mounted at least in a first defined angle position or in a second defined angle position with regard to the foot section.

A holding device in this context is preferably understood to be a device that acts between the respective surface module with the corresponding support by transferring a clamping force from the surface module to the support and thus tensions the surface module with the support. Snap-lock connections and other form-fitted contacts may be provided to secure the tension. Such a holding device may also be a clamping device with the respective surface module being braced with the corresponding support without additional snap-lock connections using only the holding device, especially by ensuring a frictional connection (especially based on surface friction) between the surface module and the support. The use of the holding device as a clamping device allows for a particularly fast and flexible installation, with a variable arrangement possible for the individual surface modules. This has advantages especially for supports that are pre-mounted on roofs and facades. Even when a single surface module in a complex system with a plurality of surface modules is to be exchanged, such clamping devices are advantageous: the clamping connection is loosened with the holding device/clamping device and the surface module may be removed. At the same time, the neighboring remaining surface module may be reinstalled with the same clamping device.

The connection element is preferably executed as a screw with a thread that may work together with a counter-thread preferably inserted into the foot section.

According to one preferred embodiment, the head section may be mounted in at least three angle positions twisted towards each other around the vertical axis with a pre-set twisting angle each relative to the foot section. This allows for particularly good flexibility during installation. The head section may, e.g. be used to attach a single surface module in three different angle positions. For this, the surface module may be arranged in three different angle positions relative to the holding device. The head section may be easily turned into the respective angle position.

According to one preferred embodiment, the holding device is arranged in such a way as to optionally attach only one surface module on the support—if the head section is in a first pre-set angle position relative to the foot section—or attach two surface modules on the support—if the head section is in a second pre-set angle position relative to the foot section. This allows the use of the same holding device to attach only one surface module or two surface modules. Then, another surface module may easily be retrofitted on a surface module already installed. For this purpose, the first surface module may be clamped in first, and as soon as the second surface module is provided, e.g. on a roof, the clamping of the first surface module may be partly removed again, and the two surface modules be clamped together. This also facilitates the individual steps during (de)installation.

The holding device may also be referred to as a middle-edge clamp since it may optionally be arranged on the edge of a single surface module or in the middle between two surface modules. In both arrangements, the holding device may function as such with comparable effect due to the various possible angle positions of the head section with respect to the foot section. Accordingly, the holding device is a complete substitution of at least a second type of mount that was required so far and had to be specially designed to be installed either at the edges or in the middle.

According to one preferred embodiment, the twisting angle is between at least two of the at least two angle positions twisted towards each other in a range around 90 degrees, preferably at 90 degrees. This allows the holding device to attach optionally either one or two surface modules on the support in the same position on the support, with the head sections each, for example, being supported by a central plate of the foot sections. The central plate is preferably executed with a square base for this purpose. Optionally, it is also possible to attach three surface modules.

The twisting angle may also be in the range around 180 degrees, preferably 180 degrees, and/or the range around 270 degrees, preferably 270 degrees. This allows the head section to be arranged in three or four relative twisting angles with regard to the foot section, and the installation is rendered particularly flexible.

According to one preferred embodiment, the head section rises above the foot section in the direction of a plane that is orthogonally aligned to the vertical axis, especially by means of a one-piece plate of the head section. This ensures that the head section can be fixed in an easy way for one, two or three surface modules, especially by means of a respective element section. The surface modules may be arranged sideways close to the foot section, or be fixed on the foot section, and the head section overlaps or protrudes from the foot section and thus the respective surface module.

According to one preferred embodiment, the head section has a support cheek that mainly extends in the direction of the vertical axis. This allows the provision of a particularly stable holding device, especially in case of an asymmetric strain on the holding device, should the holding device be used on one surface module only. When connected, the support cheek can be mounted on the foot section overlapping the foot section in the direction of the vertical axis. The support cheek extends in the direction of the vertical axis far enough to overlap the foot section.

While for an arrangement of the holding device between two neighboring surface modules the flow of forces in the holding device may spread mainly symmetrically, the holding device is asymmetrically stressed when used on the edges of a planar arrangement of surface module, and hence in no small part subject to bending stress. In order to avoid an unacceptable deformation of the holding device, it must be designed in a manner that is stable enough for use on the edges. The different stress on the holding device depending on the installation situation is also an important reason why the known holding devices are designed, or necessarily must be designed in different ways for different installation situations. By means of the support cheek, the bending forces may be received and transmitted in a useful manner.

According to one preferred embodiment, the support cheek has a width that is smaller than one width of the head section in the respective direction, which is in particular at most ⅔ of the width of the head section, preferably about half of the width of the head section. This allows the head section to be placed into different angle positions with regard to the foot section without the necessity to change the position of the foot section on the support. The support cheek does not come into contact with the support module(s), regardless of the angle position. The width of the support cheek is preferably greater than or equal to one width of the foot section in an area where the support cheek is placed. In this way, it can be ensured that the support cheek is indirectly aligned with the foot section and be placed at the foot section, protected against torsion. The width of the support cheek is preferably somewhat larger than the width of the foot section in the respective contact area, which allows the support cheek to be shifted along the foot section, and may create a lateral frame or border for the foot section in the process. Further preferred is a distance of two opposing legs or guide surfaces of the foot section smaller than the width of the support cheek, so that the support cheek is able to frame the two opposing legs or guide surfaces even in an arrangement that is twisted by 90°. The preference is for a distance that is at least approximately the width of the foot section in the contact area.

According to a preferred embodiment, the support cheek is designed in one piece with a plate of the head section, with the plate mainly extending orthogonally to the vertical axis of the holding device. This allows the provision of a holding device that remains robust and for which a bending torque and/or a force from the holding device by means of the support cheek may be introduced into the foot section. The support cheek preferably extends at least approximately orthogonal to the plate. The head section is preferably executed as a bent or a stamped and bent part. In this way, the support cheek can homogeneously and without surges within the head section transfer forces inside the plate on the foot section.

In the plate, there preferably is an opening provided that the connection element can be passed through. The opening may be, for example, a stamped-in opening or a borehole. The opening is furthermore preferably arranged concentrically and centrally around the vertical axis and in the middle of the plate. In this way, more than two arrangements with a pre-set twisting angle can be provided in a simple way.

The support cheek preferably has an outer cheek and an inner cheek. In addition, the cheeks are preferably arranged in a V-shape towards each other, or at least the outer cheek is arranged at an angle to the inner cheek that is advantageous for the reception and transmission of a bending torque. The angle between the cheeks is, for example, in a range of 5 to 45 degrees, preferably 7 to 25 degrees, still more preferably 10 to 20 degrees. This offers good stability, especially bending stiffness, and the bracing function may be fulfilled even for greater forces while using comparably little amounts of material and/or cost-efficient raw materials (especially sheet metal, e.g. steel sheet or stainless steel sheet, plastic injection molding, die-cast aluminum, die-cast zinc). The bending stiffness may be optimized especially with regard to a transversal axis that is arranged parallel to an edge of the surface module to be maintained, and orthogonally to the vertical axis. The outer cheek is preferably arranged in an angle to the vertical axis, which is, for example, in the range of 3 to 30 degrees, preferably 5 to 20 degrees, still more preferably 7 to 15 degrees. This allows a transmission of forces and/or torques from a plate in the head section into the support cheek of the head section while maintaining good rigidity and/or stability of the head section. The two cheeks may be formed by a one-piece (sheet metal) part that is bent in on itself, which is folded and/or turned over in the area of one cheek point.

According to one version, the support cheek is attached to the lower surface of the plate with one end, e.g. cold-welded. The support cheek may be attached to the underside also by means of passing, pressing, spot welding, welding or nipple fittings.

According to one version, the support cheek features two support ribs that are designed in correspondence to the foot section, i.e. the support ribs are arranged in such a way that they can be placed onto corresponding parts of the foot section. Between the supporting ribs, there is preferably a recess. A further preference is for the recess to be made on one inner cheek of the support cheek, extending also over a part section of one outer cheek of the support cheek, especially in the area of a cheek point where the outer cheek and the inner cheek adjoin. The recess is designed to interact with a protrusion on the foot section. On the one hand, this is advantageous in order to position the head section in the arrangement twisted towards each other on the foot section without danger of torsion, and to avoid a relative twisting during installation. On the other and, guiding the head section relatively to the foot section in the direction of the vertical axis of the holding device is facilitated.

According to a preferred embodiment, the support cheek forms an L-shaped profile together with one/the plate of the head section. Such a profile may be generated in a simple way and offers good stability of the arrangement, especially if the angle of the two profile limbs is smaller than 90°, e.g. 80° or if the limb forming the support cheek shows an offset towards the inside, with the offset e.g. being in the shape of an S-curve.

According to an alternative embodiment, the support cheek features a flap that is at least approximately orthogonal to the vertical axis and has an opening that the connection element can be passed through. This allows ensuring high stability while using small amounts of material and a light structure, especially with regard to a high bending torque being absorbed around the transversal axis. The flap is held by the connection element. The support cheek therefore does not necessarily have to be fixed (additionally) on a lower surface of a plate on the head section, and even the danger of a support cheek coming away from the plate can be excluded. The head section may therefore be referred to as self-locking, at least as soon as the connection element has been installed in it.

According to a preferred embodiment, the head section shows a three-sided contact section or three contact sections, especially contact edges that are each arranged to be placed on the surface module, especially on a frame section of the surface module in the respective angle position. This allows at least one contact edge to be provided for each of the different angle positions of the head section relatively to the foot section of the holding device, which may then be used for the force transmission from the holding device to the surface module. The edge may have an acute angle, i.e. an angle of less than 90°. The preferred material is metal in order to break through the anodized layer of the framed surface module.

A three-sided contact section or three contact sections have the advantage of the head section being available for particularly flexible uses, either for attaching just one surface module, or for attaching two or three surface modules. If three surface modules are attached, each side or each contact section preferably is positioned on at least one surface module, and if two surface modules are attached, preferably at least two sides or contact sections are at least partly positioned on each surface module. If only one surface module is attached, all three sides or contact sections may at least partly be positioned on the surface module.

The contact is preferably in the form of a line, i.e. the contact edges each extend in one direction only. For this, the contact edges are arranged on the same plane for convenience. Further preferred are contact edges that are formed by free end areas of the head section. The contact edges may at least approximately be formed over the entire extension of the head section in the respective direction. As a preference, a recess is formed in the head section between two adjoining contact edges. This allows an option for the simple creation of the contact sections on the head section, e.g. by bending.

The contact sections are preferably arranged in an especially same angle towards each other around the vertical axis, further preferred are adjoining contact sections at an angle of at least approximately 90 degrees to one another. Hereby, they can be wedged soundly into a frame of the surface module, especially it is possible for the contact sections to exert a friction force in different directions on the surface module and/or create a form closure in different form directions, so that the surface module can be pressed onto the respective support with greater stability. An angled arrangement between the elements allows the provision of a cross-shaped contact surface, which offers good safety with regard to a shift of the surface module relative to the holding device.

As a preference, at least two of the three at least sectional contact edges on the surface module are positioned when installed. As a further preference, at least one of the contact edges is completely positioned on the surface module, and one of the contact edges only via a part section of the contact edge.

According to a preferred embodiment, the sides of the contact section or the respective contact sections are arranged relatively to each other at an angle corresponding to the respective angle positions, especially at least partly at an angle of 90° relative to each other. This arrangement ensures that a surface module may effectively be secured independently of any specific angle position.

According to a preferred embodiment, the three contact sections are intended to be on an edge section of the head section, with the support cheek protruding from another edge section of the head section. This ensures a simple construction of the holding device, and the head section may be coupled with the respective surface module over a large overlap area, with regard to its own dimensions, which increases the stability of the connection.

According to a preferred embodiment, the three contact sections are formed by a plate of the head section, with the plate preferably showing a curvature in the area of the contact sections that point towards the foot section. This allows the contact sections to be provided on the head section in a simple way, especially be bending, and especially simultaneously. At the same time, good strength can be ensured, as the plate is plastically deformed against the subsequent (continuous) tension. The curvature is preferably created by a fold edge that extends along a respective contact section. The curvature serves especially as a means to increase the plate stiffness—just like a dome, in order to effectively transmit the force to the edges.

According to one preferred embodiment, the three contact sections have at least one protruding element each on a lower surface pointing towards the respective surface module when installed, and/or the foot section features an intervention section with at least one protruding element, with the head section and/or the foot section being made of electro-conductive material. This allows the provision of an electrical current dissipation or a grounding function (potential equalization) by means of the holding device. This makes it possible to forego additional dissipation cables on the respective surface module and/or support. The protruding element allows for an incision to be made into the anodized layer of the surface module frame.

According to one preferred embodiment, the head section and/or the foot section is/are formed as a bent part, preferably a stamped and bent part. This allows the provision of a robust holding device that has a simple construction and is cost-efficient in manufacturing. The head section and foot section are preferably formed as stamped and bent parts. Further preferred are head sections and foot sections that are exclusively obtained by stamping and bending sheet metal. Especially preferred is a holding device as a three-part assembly component, with a first single-piece part as the head section, a second single-piece part as a foot section, and a connecting element. This provides a simple, cost-effective and, not least, a structure of the holding device that can be easily handled.

According to a preferred embodiment, the foot section has two limbs that are at least partly elastically movable relative to each other, especially in a radial direction perpendicular to the vertical axis, and especially also relative to the neighboring surface sections of the foot section. This ensures simple, especially one-handed installation of the holding device on the respective support. The limbs may be moved elastically to one another in such a way as to render them sufficiently flexible to be pushed over edges and/or undercuts of the connection in a click or clip-on connection.

The foot section preferably has two limbs, each of them featuring a stamped-in surface section that is stamped into the foot section and which is offset to the inside with respect to a support section and/or a neighboring part of the respective limb, or may elastically be moved to the inside. The support section may in this case be formed by a contact area at which the support cheek can be positioned in one of the possible twisted positions. On the stamped-in surface section, there is preferably an intervention section that has a hook, which may be used to create a positive lock connection between the foot section and the support.

The stamped-in surface section is preferably only positioned elastically on one side of the remaining part of the limb, especially on the side pointing to the head section. This allows for a simple means of elastically repositioning the stamped-in surface section, especially bending it to the inside, in order to lock the holding device onto the support. The foot section may be grasped with one hand, and two fingers of that hand may position the opposing stamped-in surface sections, and elastically press down the stamped-in surface sections. A positive connection may, for example be created by means of a click or snap-lock connection, so that the foot section may also be referred to as a click-on foot. In this, simple handling of the holding device can be insured, especially also the one-handed installation of the holding device on the support. The hook is preferably formed by a surface section that is stamped into the intervention section and bent outwards compared to the neighboring part of the intervention section. This allows an advantageous acoustic feedback as well for the installation worker by means of a clicking sound.

The intervention section preferably has a width that is greater than the width of a corresponding limb. This allows the holding device to be arranged on a support in a particularly robust manner, even if no surface module has been installed yet and the holding device stands out freely from the support. If the intervention section has a suitable width, the holding device cannot easily fall out of the support, or be hauled out, but instead the stamped-in surface section(s)

must be purposely elastically deformed. However, this is not done without a corresponding action, especially since the stamped-in surface sections are offset towards the inside compared to the neighboring part of the limb. The width of the intervention section is furthermore preferably in the range of half the circumference of one foot section around the vertical axis, especially the width is at least approximately the same as half the circumference. This allows use of the entire material in case of a stamped and bent part, and be advantageously used for the holding device function. The hook in a particularly preferred version is at least approximately formed across the entire width of the intervention section. This further improves stability, especially the stability of the arrangement and/or fastening on the support. Any contact pressure on the support interfaces can be kept low.

The intervention section preferably has a contact edge on its lower surface that allows the foot section to come into contact with a support. By creating the intervention section as wide as possible, and preferably providing for the contact edge to cover the entire width of the intervention section, a holding device can be provided that can be connected with a support in a particularly robust and safe manner. This facilitates the installation of surface modules, especially on a sloping roof, so that the holding device may at first be connected only with the support and be freely attached to the support without the need to connect the holding device immediately with a surface module.

According to one version, the foot section has a protrusion and/or a protruding twist protection that is made to co-act with the support cheek, especially a recess in the support cheek. Furthermore, the foot section preferably has four twist protections that are arranged in positions that are twisted towards each other by 90 and/or 180 and/or 270 degrees with regard to the vertical axis. This allows the head section to be guided and centered on four sides of the foot section in a respective twisting angle arrangement with a given twisting angle respectively.

According to one preferred embodiment, the foot section shows a guide surface and/or a contact surface, each one to support the support cheek, on which the support cheek may be positions and/or repositioned in a pre-set twisting angle relative to the foot section. This allows a stable arrangement to be provided, with a bending torque from the support cheek to the foot section that is possible in a stable and especially also a symmetrical manner. Optionally, the guide surface may also be created as one or several bridges, and/or be provided by one or several bridges.

Preferably, the holding device has two limbs on which two bridges and/or two guide surfaces each are provided, with the support cheek preferably being positioned in a respective arrangement with a given twisting angle on two of the four bridges or guide surfaces. A narrow side of the foot section may form a respective bridge. Optionally, the bridge may also be formed by a protruding part, e.g. a rail or a material thickening.

A respective guide surface may be formed by bent surface section of the foot section. Preferably, the foot section has a central plate in which an internal thread is provided for, which co-acts with the connecting element; and the surface sections are bent towards the central plate and arranged at an angle of at least approximately 90 degrees towards the central plate. This ensures a compact, symmetrical and stable construction. The foot section nevertheless can be manufactured in a simple way. The internal thread is preferably arranged in the middle of the central plate. In this way, several arrangements at a given twisting angle may be provided in a simple manner, especially two to four arrangements. Due to the contact surface, a support for the support cheek may be provided in an (additional) twisting arrangement.

The guide surface is preferably bent towards the central plate in such a way and arranged in such relation to central plate that an indentation is formed between the central plate and the guide surface.

The central plate preferably has a width that is at least approximately the width of the support cheek. This ensures a particularly stable support of the head section on the foot section. The indentation in a further preferred version is at least approximately formed across the entire width of the central plate. This allows the provision of a counter bearing for the cheek tip of the support cheek by means of the indentation, in which the cheek tip may optionally be arranged. In this way, the installation of the surface module on the support may occur with a pre-settable pre-tension force, as the head section is preferably only screwed onto or pushed onto the foot section until the cheek tip comes to rest in the indentation. This also may serve to provide an overload protection for the holding device and/or a holding device with pre-settable force on the surface module, e.g. for particularly sensitive frames of surface modules. This also may avoid any damage, e.g. breaking of the glass of the photovoltaic laminate.

According to one preferred embodiment, the foot section has a U-shaped profile and features two opposing contact surfaces on which one/the support cheek is placed and can be positioned relative to the foot section by means of surrounding edges. This allows the head section to be guided on the foot section without torsion.

According to one preferred embodiment, the foot section has a guide section that is arranged on one/the contact surface and is arranged to guide the connection element to position the head section relative to the foot section. This arrangement facilitates installation and may increase the stability of the arrangement. At the same time, it is optionally possible to effect a pre-tension on limbs or surfaces of the foot section towards the outside.

According to one preferred embodiment, the connection element is guided in the foot section in such a way that the holding device becomes self-locking. This further improves the functioning of the holding device. The self-lock may, for example, be obtained by positioning the connection element on the inside of the contact sections of intervention sections on the foot section.

The purpose mentioned above is also achieved with a system of at least one surface module, especially a framed solar panel, at least one support, especially a profile rail and at least one holding device according to the invention.

According to a preferred embodiment, the holding device is connected to the at least one surface module and the support by having the foot section of the holding device being positively connected to the support and preferably subject to a tensile load, and the head section is positioned on the at least one surface module, preferably with at least two contact sections, and is preferably mainly subject to bending stress. This allows for a simple and safe way of clamping the surface module onto the support.

According to one preferred embodiment, the support has at least one protruding, especially internal edge section, which an intervention section of the foot section of the holding device may positively lock onto. In this way, an installation system can be provided which allows the holding device first to be installed onto the support in a particularly safe manner.

According to one preferred embodiment, the holding device features three contact sections, at least two of which are on contact with the respective surface module. This allows the head section to be positioned on a frame of the surface module with improved hold. In comparison to just one single contact surface, the danger decreases that the head section is offset relatively to the surface module.

Figure 2:
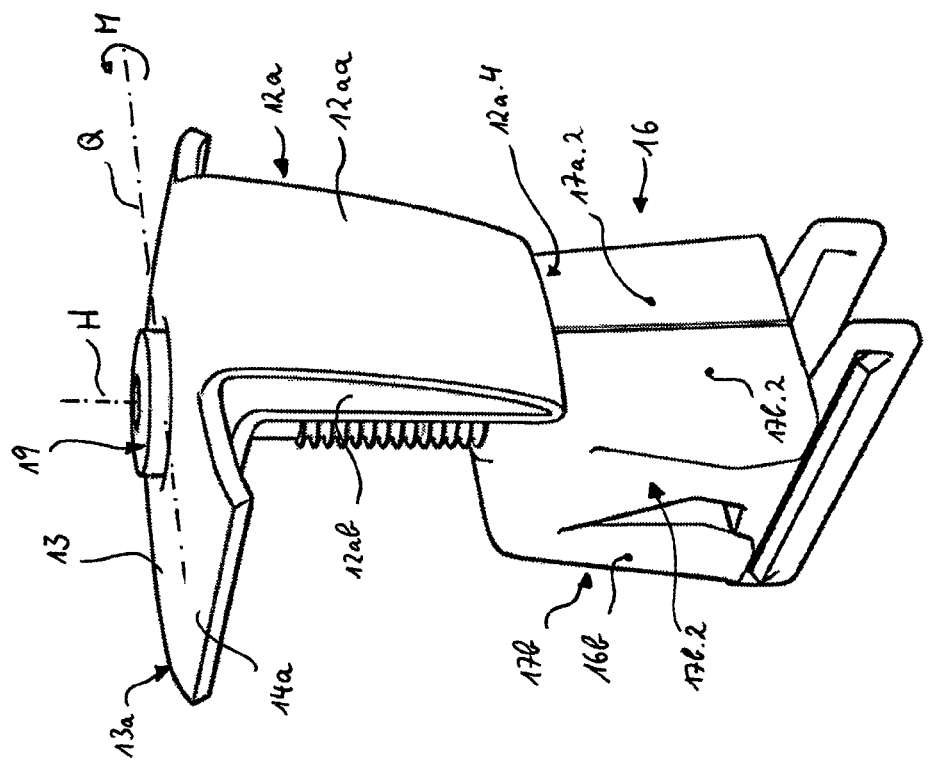
Figure 3:
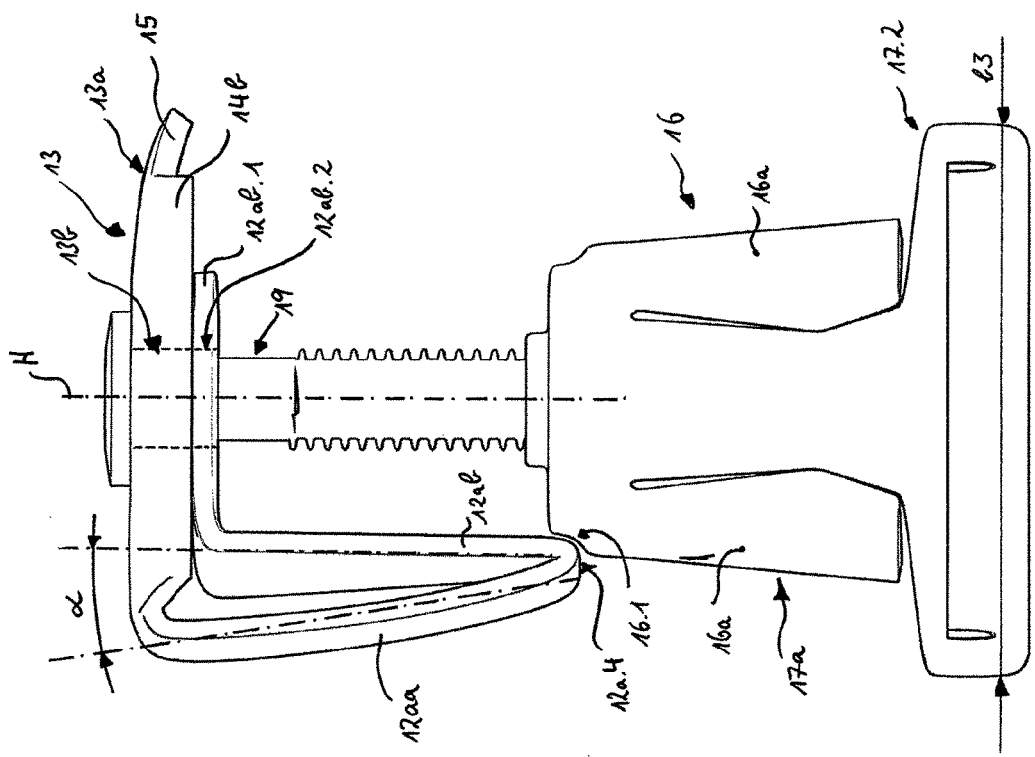
Figure 4:
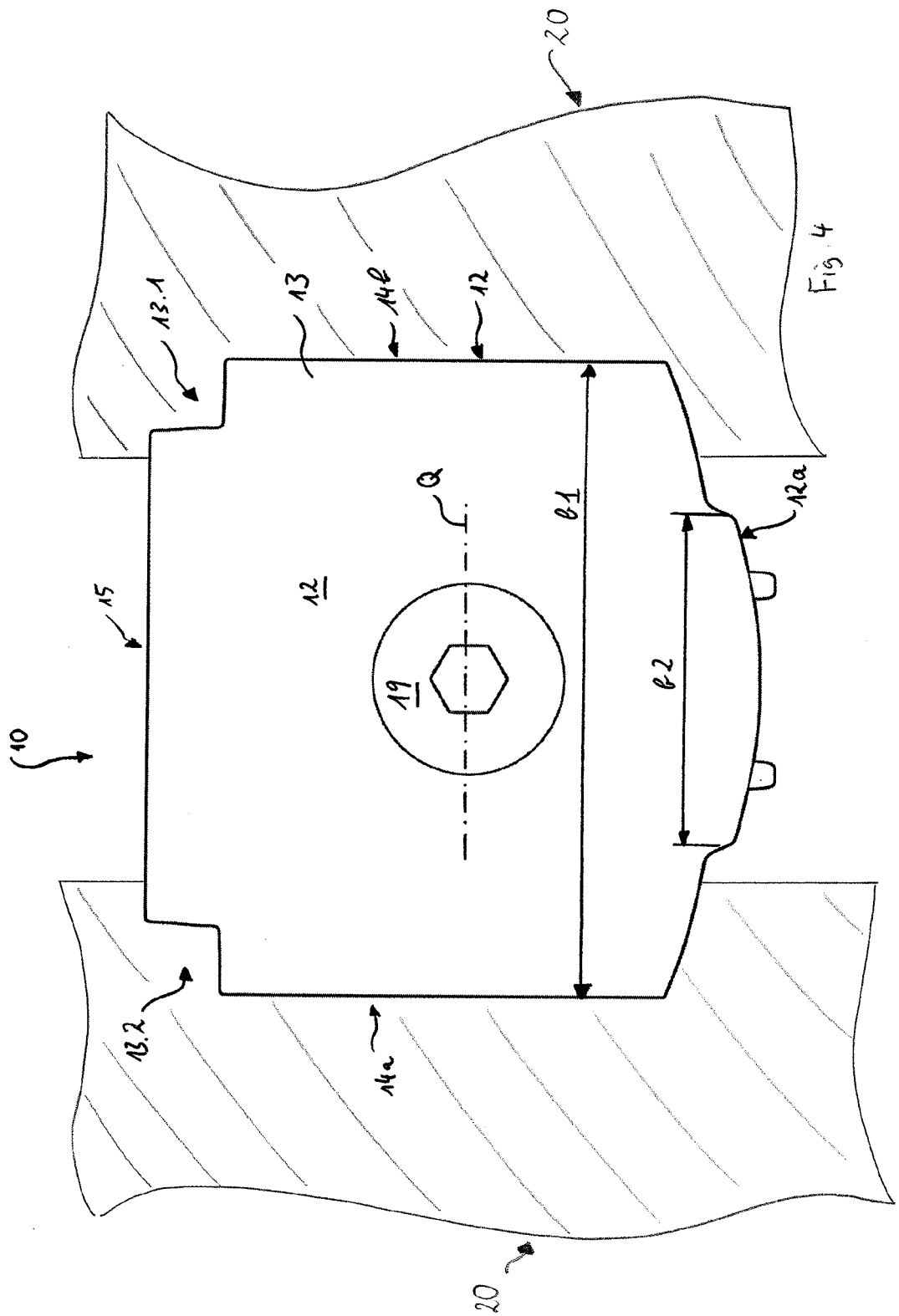
Figures 14A, 14B:
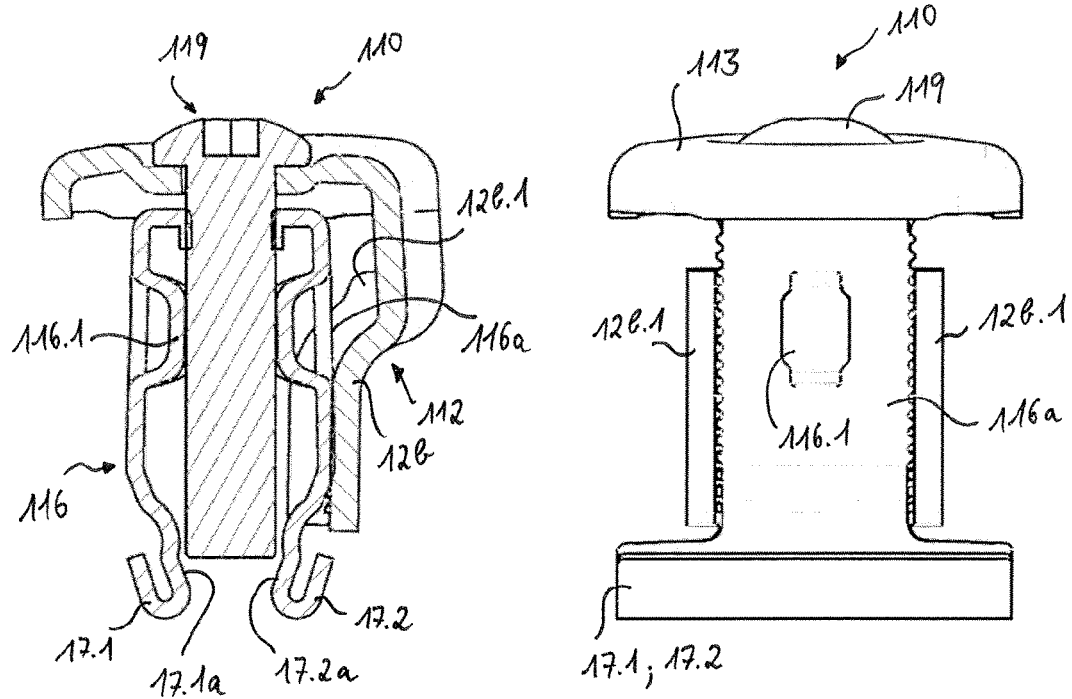
Figure 14C:
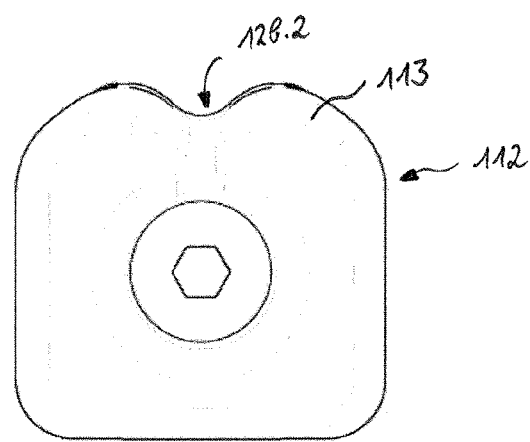

The following illustrations describe the invention in more detail. For reasons of clarity, some reference signs are not stated or explained in every illustration. In those cases, reference is made to the respective other illustrations. They show:

FIG. 1 a schematic depiction in perspective view of a holding device according to one example embodiment of the invention in one of several possible angle positions;

FIG. 2 a further schematic depiction in perspective view of the holding device shown in FIG. 1;

FIG. 3 a side view of the holding device shown in FIG. 1;

FIG. 4 a top view of the holding device shown in FIG. 1 in its function as a middle clamp;

FIG. 5 a schematic depiction in perspective view of the holding device shown in FIG. 1 in one of several possible angle positions installed on a support;

FIG. 6 a further schematic depiction in perspective view of the holding device with the support shown in FIG. 5;

FIG. 7 a front view of the holding device and the support shown in FIG. 5;

FIG. 8 a side view of the holding device and the support shown in FIG. 5;

FIG. 9a a further schematic depiction in perspective view of the holding device with the support shown in FIG. 1 in its function as an edge clamp;

FIG. 9b a further schematic depiction in perspective view of the holding device shown in FIG. 1 in another angle position in its function as a middle clamp;

FIG. 10 a schematic depiction in side view of the holding device according to another example embodiment of the invention in one of several possible angle positions in installed state on a support;

FIG. 11 a top view of the holding device shown in FIG. 10 in its function as a middle clamp;

FIG. 12A, 12B a front view and a side view of a head section of a holding device according to another example embodiment;

FIG. 13A, 13B a side view and a top view of a foot section of a holding device according to the further example embodiment of the holding device as shown in FIG. 12A, 12B;

FIG. 14A, 14B, 14C a sectional view and a front view of the holding device shown in FIG. 12A, 12B, 13A, 13B in assembled state according to an arrangement mounted on a profile rail; and FIG. 15A, 15B perspective side views of the head section and the foot section of the holding device described in FIGS. 12A to 14C.

FIG. 1 shows a holding device 10 that has a head section 12 and a foot section 16 connected to the head section 12 with a screw 19. The screw 19 passes through a plate 13 of the head section 12 and engages with a counter-thread in a central plate 16c of the foot section 16. The screw 19 is aligned on a vertical axis H and may be guided centrally through the plate 13 and the central plate 16c. The plate 13 can be pivoted around the vertical axis H relative to the screw 19 and can be arranged in different angle positions, in particular four different angle positions. The plate 13 has three contact sections 14a, 14b, 15 that are each created by a curvature 13a on the plate 13. The contact sections 14a, 14b, 15 protrude at the lower end in reference to the otherwise planar direction of the plate, thus creating contact edges. The contact edges allow the plate 13 to be coupled with one or two (or optionally three) surface modules. On those contact edges, protruding elements may be provided (not shown), especially in the direction of the lower end on the vertical axis H, which can be pressed into the surface module when clamped with a surface module and can create an electrical connection between the plate 13 and the surface module, especially by breaking a surface coating, e.g. an anodization of the surface module.

On one of the contact sections 15, a force arrow F1 is indicated that symbolizes a force from a surface module (not shown) affecting the plate 13 and generating a bending torque M around a transversal axis Q. The bending torque M is mainly created when the holding device 10 is coupled with only one surface module, and/or only one surface module is clamped onto the contact edge 15. The contact edges 14a, 14b, 15 are arranged in such a way that they can be positioned on a respective surface module at least in pairs. In case a single surface module is clamped, the contact edge 15 can be fully positioned on the surface module, and the contact edges 14a, 14b each with a short segment on the side of the contact edge 15. In case two opposite surface modules are clamped, the contact edges 14a, 14b can each be positioned fully on the respective surface module and the contact edge 15 can be positioned with a short segment on the side of the contact edges 14a, 14b on the respective surface module. This creates secure clamping since clamping edges in different directions can exert a clamping force and/or a frictional connection.

The bending torque M is mainly transmitted from the head section 12 to the foot section 16 by a support cheek 12a and/or is introduced there as a contact pressure. For this purpose, the foot section 16 has areas or sections that co-act with the support cheek 12a, namely the contact surface 16a and the indentations 16.1, 16.2, with the support cheek 12a being positioned in one of the indentations 16.1 and/or can be supported there in the arrangement shown. Together with the indentation 16.1, optionally a limiter and/or a stop can be provided up to which the support cheek 12a may be repositioned along the foot section 16 in order to set a predefinable clamping force. A cheek tip 12a.4 of the support cheek 12a may be used in the indentation 16.1. The foot section 16 furthermore features two limbs 17a, 17b with a stamped-in surface section 17a.2 provided on each one, which each has an intervention section 17.1, 17.2. The intervention sections 17.1, 17.2 are intended to co-act with a respective profile on a support (not shown). The limbs 17a, 17b furthermore feature a guide surface 17a.1, 17b.1 where the support cheek 12a in another arrangement may be positioned. The central plate 16c has a rectangular, especially a square base form. This allows the support cheek 12a to be positioned on all four sides of the central plate 16c, or be guided to pass all four sides of the central plate 16c and be held at a defined distance to the vertical axis H.

The holding device 10 is executed as a stamped and bent part. For this purpose, the head section 12 may be made of one part, especially by stamping the contour of the plate 13 (with an opening in it for the screw 19) from a (metal) sheet as well as the support cheek 12a. Then, the curvatures 13a are introduced and the support cheek 12a is bent. The foot section 16 may also be formed from one part, especially by cutting an internal thread into the central plate 16c starting from a (metal) sheet, and the (respective) stamped-in surface section 17a.2 is stamped, the intervention sections 17.1, 17.2 are created and then the (respective) guide surface 17a.1, 17b.1 is b folded over. This allows for a fast, cost-efficient manufacture and a low unit cost.

FIG. 2 shows an outer cheek 12aa and an inner cheek 12ab of the support cheek 12a that are in a V-shaped position to one another. The inner cheek 12ab is supported on the screw 19. The support cheek 12a is produced in one piece with the plate 13 from a panel material. The curvatures 13a may be introduced by bending. Furthermore, additional guide surfaces 17a.2, 17b.2 as well as another stamped-in surface section 17b.2 are shown. The support cheek 12a may slide along the guide surfaces 17a.2, 17b.2.

FIG. 3 schematically indicates how the screw 19 can be passed through the plate 13, and how the inner cheek 12ab can be supported on the screw 19. Plate 13 shows an opening 13b that is indicated by a broken line. The opening 13b may, for example, be a borehole or a punching. The inner cheek 12ab has a flap 12ab.1 that extends at least approximately orthogonal to the screw 19. Thus, the inner cheek 12ab in its profile is at least approximately rectangular. An opening 12ab.2 is provided on the flap 12ab.1, indicated by a broken line. The opening 12ab.2 may, for example, be a borehole or punching. The screw 19 is passed through the opening 12ab.2. This allows the support cheek 12a to rest both on the foot section 16, especially on the indentation 16.1 and the screw 19. This leads to good stability. The flap 12ab.1 is designed to withstand a tensile load. The inner cheek 12ab and the outer cheek 12aa are arranged at an angle α of about 10 degrees, with the inner cheek 12ab at least approximately being arranged parallel to the vertical axis H. This allows a force and/or a torque to be transmitted from the plate 13 to the foot section 16 at an advantageous angle. The outer cheek 12aa for this is arranged at an angle that would make it coincide with the intervention section 17.2 in the area of the vertical axis H when prolonged downwards in the direction of the intervention section 17.2. This allows a force exerted by the support cheek 12a on the foot section 16 to be transmitted centrically onto a support in the area of the vertical axis H, which allows for a robust arrangement.

The intervention section 17.2 has a width b3 that is greater than an expansion of the contact surface 16a in the respective direction. The width b3 is in the size range of the expansion of the plate 13 in the respective direction. This allows a clamping force to be applied between the respective contact section 14b and a surface module on the one hand and a force between the respective intervention section 17.2 and a support over a comparable longitudinal section, which firstly allows for a robust arrangement and secondly ensures comparable contact forces on both interfaces.

FIG. 4 shows recesses 13.1, 13.2 on the two corners of the sides of plate 13 where the support cheek 12a is not intended. The recesses 13.1, 13.2 have the advantage that the contact sections 14a, 14b, 15 may easily be formed by a curvature provided in each case on the plate 13, with the recesses 13.1, 13.2 being applied (especially stamped) before the curvature is provided. Therefore the plate 13 has a rectangular, especially a square base form. The contact sections 14a, 14b, 15 are formed across the entire lateral length of plate 13 except for the recesses 13.1, 13.2. Plate 13 has a width b1. The support cheek 12a has a width b2 that is smaller than the width b1 of the plate 13. Plate 13 overlaps the support cheek 12a on both sides of the support cheek 12a. This ensures that a respective contact edge 14a, 14b can be positioned on a respective surface module 20. The surface modules 20 are only hinted at in FIG. 4 for a better overview. In addition to the respective contact edge 14a, 14b, there is also a brief section of the contact edge 15 that is positioned on the respective surface module 20. This ensures safe clamping. The short section of the contact edge 15 can ensure, for example, that a surface module 20 does not shift along the expansion direction of the respective contact edge 14a, 14b relative to the holding device 10. The holding device 10 in its function as a middle clamp also especially serves to keep the two modules it holds at a predetermined distance to one another.

In FIG. 5, a system 1 consisting of a holding device 10 (especially the holding device shown in FIG. 1) and a support 30 is shown, with the holding device 10 potentially being clamped to one or two surface modules that are not shown to provide a better overview, at an arrangement of the head section relative to the foot section twisted at 90°. On plate 13 of the holding device 10, two force arrows F2 are indicated that each symbolize a force that would be exerted on the plate 13 from two surface modules (not shown) after installation, if the holding device 10 is used as a middle clamp. In contrast to this, in an arrangement as an edge clamp, only one force applies from the support cheek 122 on the plate 13 of the head section 12 from the opposite side. The forces F2 do not generate a bending torque around the transversal axis Q but rather a tensile force on the screw 19 and a bending torque within plate 13, which, however, does not have to be transmitted on the foot section 16 via the support cheek 12a. In this stress situation shown as an example, the head section 12 mainly co-acts with the foot section 16 by means of the screw 19 under tensile stress. The support cheek 12a in this stress situation does not have a primary function for the transmission of forces. However, the support cheek 12a may serve to adjust a certain clamping force even in this stress situation for the holding device 10, especially by positioning the cheek tip 12a.4 into a pre-defined position on the foot section 16. Nevertheless, a further surface module may be provided, namely on contact section 15 opposite support cheek 12a. In this case, the support cheek 12a also had the function to transmit a bending torque created around the transversal axis Q to the foot section 16.

The support 30 is formed as a profile rail with an inner profile 32 on one module side 31 of the support 30. The holding device 10 is coupled to the profile rail 30 on the module side 31 by means of the intervention sections 17.1, 17.2. The profile rail 30 has a lateral area 33a and a lower surface 24. The limbs 17a of the foot section 16 may be positioned on the module side 31. Furthermore, one of the stamped-in surface sections 17a.2 is shown that is folded to the inside (as well as the other non-apparent stamped-in surface section) and/or offset to the inside with respect to the contact surface 16a. The stamped-in surface areas therefore allow the provision of a clip connection that is simple to handle, especially one-handedly, which is advantageous for installation, e.g. on a sloped roof.

FIG. 6 shows one of the stamped-in surface sections 17b.2 that is folded over to the inside or offset with regard to the contact area 16b. In this arrangement, the stamped-in surface area 17b.2 exerts an elastic pretension force on the internal profile 32. In addition, another lateral surface 33b is shown with provisions made for a further profile. Optionally, a holding device or a further installation device may be arranged on the profile, or the support 30 may be directly attached to a roof brace of a facade by this means.

FIG. 7 shows that the width b2 of the support cheek 12a at least approximates the width b4 of the central plate. This allows the support cheek 12a to introduce a force into the foot section 16 over a large area without any (point) surges. The width b2 of the support cheek 12a is at least generally uniform, i.e. also the cheek tip 12a.4 shows a width in the range of the width b4. This allows the transmission of a force over a surface that is as large as possible, at a pressure on the foot section 16 that is as low as possible. The inner cheek 12ab.1 is guided back until it is under the plate 13, so that the flap 12ab.1 is arranged underneath plate 13 adjoining plate 13. This ensures that the function of the support cheek 12a is at least largely independent of the distance the plate 13 has to the central plate 16c, i.e. the clamping height at which the holding device 10 must be installed. The intervention sections 17.1, 17.2 have hooks 17.11, 17.12 that engage behind the inner profile 32. The hooks 17.11, 17.12 may, for example, be formed by bending at the intervention sections 17.1, 17.2.

FIG. 8 shows the direction of the outer cheek 12aa with respect to the vertical axis, with an angle β of about 8 degrees to an axis that is parallel to the vertical axis H is shown. This arrangement of the outer cheek 12aa with respect to the vertical axis H and/or the screw 19 allows the transmission of a force or a torque from the plate 13 to the foot section 16 at an advantageous angle. The angle β is preferably smaller than the angle α described in connection with FIG. 3. In other words, the inner cheek 12ab is preferably inclined at an angle to the vertical axis H that is placed counter to the angle at which the outer cheek 12aa is inclined to the vertical axis H. This allows a stable support of the support cheek 12a on the foot section 16 as well as on the screw 19 and a force triangle with an effective direction can be provided. An arrangement of the inner cheek 12ab that is inclined inwards provides good shape stability for the support cheek 12a.

The stamped-in surface section 17b.2 is formed with a double-cone, and the tips of the cones pointing towards each other. It extends over a large area of the contact surface 16b, especially at least across ⅔ of the extension of the contact surface 16b in the direction of the vertical axis H. This allows the provision of an elastic bending mechanism that is easy to use, and the bending tension in the transition area between the stamped-in surface section 17b.2 and the contact surface 16b can be kept at a low level. This ensures frequent reusability of the holding device 10, which means repeated (de)installation, and at the same time, a pretension for the elastic pressure of the stamped-in surface section 17b.2 on a profile rail can be maintained over a long period of time.

FIG. 9a shows the holding device 10 seen from below. The design of the head section 12 with the support cheek 12a in one piece is clearly visible, with the latter extending in a V-shape from the plate 13, with the flap 12ab.1 being arranged at least approximately parallel to the plate 13 and at least approximately orthogonal to the screw 19. The support cheek 12a rests on one of the indentations 16.2 with the cheek tip 12a.4.

FIG. 9b shows the holding device 10 seen from below at another angle position. Compared to the foot section 16, the head section 12 is twisted around the vertical axis H at an angle of 90 degrees. The support cheek 12a does not rest on one of the indentations 16.2, but on one of the contact surfaces 16a, 16b.

FIG. 10 shows an example embodiment where the head section 12 does not have a support cheek with a flap, but instead a support cheek 12b formed as a bracket or angle, i.e. a support cheek 12b without any additional inner cheek. The head section 12 is formed as an L-shaped angle profile in this case, with a cheek 12ba protruding downwards. The cheek 12ba of the support cheek 12b may in such case be arranged at an angle β as the outer cheek 12aa described in FIG. 8, which allows for good pre-tension features of the support cheek 12b. The explanations regarding the support cheek 12a described in the previous illustrations may be applied logically on the one-cheeked support cheek 12b as well.

FIG. 11 shows an example embodiment where the support cheek 12b has a fold or edge 12b.1 on opposite sides. The support cheek 12b and partly the plate 13 of the head section 12 each have a beading 12b.2. The beading 12b.2 can ensure advantageous distribution of forces and also has advantages for the generation of the respective geometry. The surrounding edge 12b.1 is suitable for coming into contact with the surface of a profile and/or a profile rail and has an appropriate length for this. The surrounding edge 12b.1 is preferably executed over the entire length of the support cheek 12b as described below in the context of the following illustrations. The surrounding edge 12b.1 allows a slide function for the translational shifting of the holding device 10 on a profile rail.

The width of the support cheek 12b is greater than the width of the foot section 16, which allows the support cheek 12b to surround or frame the foot section 16 when the head section 12a is screwed onto the foot section 16.

FIG. 12A shows a head section 112 with a plate 113 that is arranged to be pushed or screwed onto a foot section and secure the foot section in the process. FIG. 12B shows a support cheek 12b with a surrounding edge 12b.1 that can be used to determine the direction of the head section 112 relative to the foot section (FIG. 13A). The surrounding edge 12b.1 may frame one of the contact surfaces of the foot section in the process. In the range of the surrounding edge 12b.1 of the support cheek 12b, the head section 112 has a snap contour 12b.3 (e.g. indentations or grooves) that is positively connected and corresponds geometrically to a respective snap contour on the foot section. The support cheek 12b is formed from a limb of an L-profile that forms the plate 113 and the support cheek 12b. The support cheek 12b has an offset 12b.4 to the inside, especially an S-shaped contour. The S-shaped contour on the one hand may provide an advantageous force-flow path; on the other hand, the support cheek 12b can be positioned on a noticeably narrower foot section in this form.

FIG. 13A shows the corresponding foot section 116. The foot section 116 has two opposite contact surfaces 116a which each feature a guide section 116.1 to guide a connecting element, especially a screw. The guide section 116.1 may be formed as a part of the respective contact surface 116a that is bent inwards or stamped. The guide section 116.1 has a width b5 that corresponds to about one third of the width of the contact surface 116a. On a respective lateral edge of the contact surfaces 116a, snap contours 116.2 are formed that geometrically correspond to the snap contours 12b.3 of the head section 112. Those snap contours may be used to position the head section 112 relative to the foot section 116 in pre-definable relative positions. The foot section 116 furthermore has two intervention sections 17.1, 17.2 that are arranged opposite each other.

FIG. 13B shows a central plate 116c of the foot section 116 with a threaded bore 18 as indicated by the internal and external diameter of the thread that are not dimensioned. The threaded bore 18 is formed in geometrical correspondence to a thread on the connecting element, especially a screw. The foot section 116 has a U-shape cross section.

FIGS. 14A and 14B show a holding device 110 comprising the head section 112 and the foot section 116 as described above. The head section 112 has been positioned relative to the foot section 116 with the screw 119, with the screw 119 passing through the two guide sections 116.1. The guide sections 116.1 may have a contour or structure corresponding to the threat of the screw 119. The intervention sections 17.1, 17.2 each have a contact section 17.1*a*, 17.2*a* on which a lower free end of the screw 119 may be positioned in such a way that the intervention sections 17.1, 17.2 cannot be shifted to the inside. This allows the holding device 110 to self-lock. FIG. 14B indicates how the surrounding edges 12*b*.1 can engage the respective contact surface 116*a* in such a way to allow the angle position of the head section 112 to be predefined and invariable relative to the foot section 116.

FIGS. 14A, 14B show an arrangement of the holding device 110 where the surrounding edges 12*b*.1 only engage one of the contact surfaces 116*a*. Alternatively, the head section 112 may also be aligned in such a way relative to the foot section 116 that the surrounding edge 12*b*.1 engages both contact surfaces 116*a*, with the surrounding edges 12*b*.1 and the support cheek 12*b* then not covering one of the contact surfaces 116*a* but laterally frame the two contact surfaces 116*a*. In this arrangement, the surrounding edges 12*b*.1 may equally ensure that the angle position of the head section 112 relative to the foot section 116 is pre-defined and invariable by coming into contact with the two contact surfaces 116*a*. In this arrangement, the head section 112 is twisted by 90° in one or the other direction relative to the foot section 116 with regard to the arrangement shown in FIGS. 14A, 14B. The width of the respective contact surface 116*a* here preferably corresponds to the distance of the contact surfaces 116*a* to each other. This ensures an exact alignment of the head section 112 relative to the foot section 116 in all relative angle positions.

FIG. 14C shows a beading 12*b*.2 of the head section 112. This beating 12*b*.2 here preferably corresponds to a concave arched section of the support cheek 12*b* and also extends to the plate 113. The beading 12*b*.2 can firstly ensure high shape stability of the support cheek 12*b*, and secondly the forming of the head section 112 to generate the support cheek 12*b* may be facilitated.

FIGS. 15A and 15B each show the head section 112 and the foot section 116 in a perspective lateral view that shows the simple, robust construction for the entire holding device. The holding device consists of only three parts, together with a/the connecting element.

LIST OF REFERENCE SYMBOLS

1 System, especially solar module system
10; 110 Holding device
12; 112 Head section
12*a* Support cheek
12*b* Support cheek formed as an angle piece
12*b*.1 Surrounding fold, surrounding edge
12*b*.2 Beading
12*b*.3 Snap contours (e.g. groove or depression)
12*b*.4 Offset to inside
12*a*.4 Cheek point
12*aa* Outer cheek
12*ba* Cheek
12*ab* Inner cheek
12*ab*.1 Flap on inner cheek
12*ab*.2 Opening in flap
13; 113 Plate
13*a* Curvature
13.1 Recess, especially punch-out
13.2 Recess, especially punch-out
13*b* Opening in plate
14*a* Contact section, especially contact edge
14*b* Contact section, especially contact edge
15 Contact section, especially contact edge
16; 116 Foot section
16.1 Indentation
16.2 Indentation
116.1 Guide section
116.2 Snap contours (e.g. groove or depression)
16*a*; 116*a* Contact surface
16*b* Contact surface
16*c*; 116*c* Central plate
17*a* Limb
17*b* Limb
17*a*.1 Guide surface and/or bridge on limb
17*b*.1 Guide surface and/or bridge on limb
17*a*.2 Stamp-in surface section on limb
17*b*.2 Stamp-in surface section on limb
17.1 Intervention section
17.1*a* Contact section
17.2 Intervention section
17.2*a* Contact section
17.11 Hook on intervention section
17.12 Hook on intervention section
18 Threaded hole
19; 119 Connecting element
20 Surface module
30 Support, especially profile rail
31 Module side
32 Profile, especially internal profile and/or protruding edge section
33*a* Lateral surface
33*b* Lateral surface
34 Lower surface
b1 maximum width of the head section and/or width of one plate of it
b2 Support cheek width
b3 Intervention section width
b4 Central plate width
b5 Guide section width
F1 Force applied on head section for clamping with one surface module
F2 Force applied on head section for clamping with two surface modules
H Vertical axis
M Bending torque around the transversal axis
Q Transversal axis
α Angle between the cheeks 12*aa*, 12*ab*
β Angle between the vertical axis and the outer cheek

The invention claimed is:

1. A holding device (10; 110) to attach a surface module (20) on at least one support (30), the holding device comprising:
a head section (12; 112) suited for interacting with the surface module (20);
a foot section (16; 116) suited for interacting with the support (30);
a connecting element (19; 119) that is suited for connecting the head section (12; 112) with the foot section (16; 116), with the head section (12; 112) being shiftable relative to the foot section (16; 116) along a vertical axis (H) of the holding device (10; 110) by means of the connecting element (19);
characterized in that head section (12; 112) is configured to be mounted in at least two angle positions twisted towards each other around the vertical axis (H) in a pre-set (relative) twisting angle in such a way relative to the foot section (16; 116) that the head section is configured to be mounted in at least two of the angle positions respectively on one or more surface modules;

characterized in that the head section (12; 112) has a support cheek (12a; 12b) that extends mainly in the direction of the vertical axis (H); and characterized in that the support cheek (12a; 12b) has a width (b2) that is smaller than a width (b1) of the head section (12; 112) in the corresponding direction.

2. The holding device (10; 110) according to claim 1, characterized in that the head section (12; 112) relative to the foot section (16; 116) is configured to be mounted in at least three angle positions that are twisted against each other around the vertical axis (H) with a respective pre-determined twisting angle.

3. The holding device (10; 110) according to claim 1, characterized in that the holding device (10; 110) is suitable to attach at least one surface module (20) on the support (30) in a respective angle position.

4. The holding device (10; 110) according to claim 1, characterized in that the twisting angle between at least two of the at least two angle positions twisted towards each other is about 90 degrees.

5. A holding device (10; 110), comprising:
a head section (12; 112) suited for interacting with the surface module (20);
a foot section (16; 116) suited for interacting with the support (30);
a connecting element (19; 119) that is suited for connecting the head section (12; 112) with the foot section (16; 116), with the head section (12; 112) being shiftable relative to the foot section (16; 116) along a vertical axis (H) of the holding device (10; 110) by means of the connecting element (19);
characterized in that head section (12; 112) is configured to be mounted in at least two angle positions twisted towards each other around the vertical axis (H) in a pre-set (relative) twisting angle in such a way relative to the foot section (16; 116) that the head section is configured to be mounted in at least two of the angle positions respectively on one or more surface modules;
characterized in that the head section (12; 112) has a support cheek (12a; 12b) that extends mainly in the direction of the vertical axis (H); and
wherein a width of the support cheek is at least about half a width of the head section (12; 112).

6. A holding device (10, 110), comprising:
a head section (12; 112) suited for interacting with the surface module (20);
a foot section (16; 116) suited for interacting with the support (30);
a connecting element (19; 119) that is suited for connecting the head section (12; 112) with the foot section (16; 116), with the head section (12; 112) being shiftable relative to the foot section (16; 116) along a vertical axis (H) of the holding device (10; 110) by means of the connecting element (19);
characterized in that head section (12; 112) is configured to be mounted in at least two angle positions twisted towards each other around the vertical axis (H) in a pre-set (relative) twisting angle in such a way relative to the foot section (16; 116) that the head section is configured to be mounted in at least two of the angle positions respectively on one or more surface modules;
characterized in that the head section (12; 112) has a support cheek (12a; 12b) that extends mainly in the direction of the vertical axis (H); and
characterized in that the support cheek (12a; 12b) is formed in one piece together with a plate (13; 113) of the head section (12; 112) with the plate (13; 113) extending mainly orthogonally to the vertical axis (H) of the holding device (10; 110).

7. A holding device (110), comprising:
a head section (12; 112) suited for interacting with the surface module (20);
a foot section (16; 116) suited for interacting with the support (30);
a connecting element (19; 119) that is suited for connecting the head section (12; 112) with the foot section (16; 116), with the head section (12; 112) being shiftable relative to the foot section (16; 116) along a vertical axis (H) of the holding device (10; 110) by means of the connecting element (19);
characterized in that head section (12; 112) is configured to be mounted in at least two angle positions twisted towards each other around the vertical axis (H) in a pre-set (relative) twisting angle in such a way relative to the foot section (16; 116) that the head section is configured to be mounted in at least two of the angle positions respectively on one or more surface modules;
characterized in that the head section (12; 112) has a support cheek (12a; 12b) that extends mainly in the direction of the vertical axis (H); and
characterized in that the support cheek (12b) forms an L-shaped profile together with a plate (113) of the head section (112).

8. The holding device (10; 110) according to claim 1, characterized in that the head section (12; 112) has one of a three-sided contact section and three contact sections (14a, 14b, 15).

9. A holding device (10; 110), comprising:
a head section (12; 112) suited for interacting with the surface module (20);
a foot section (16; 116) suited for interacting with the support (30);
a connecting element (19; 119) that is suited for connecting the head section (12; 112) with the foot section (16; 116), with the head section (12; 112) being shiftable relative to the foot section (16; 116) along a vertical axis (H) of the holding device (10; 110) by means of the connecting element (19);
characterized in that head section (12; 112) is configured to be mounted in at least two angle positions twisted towards each other around the vertical axis (H) in a pre-set (relative) twisting angle in such a way relative to the foot section (16; 116) that the head section is configured to be mounted in at least two of the angle positions respectively on one or more surface modules;
characterized in that the head section (12; 112) has one of a three-sided contact section and three contact sections (14a, 14b, 15); and
characterized in that the one of the three-sided contact section and the three contact sections (14a, 14b, 15) is formed by a plate (13; 113) of the head section (12; 112).

10. The holding device (10; 110) according to claim 1, characterized in that at least one of the head section (12; 112) and the foot section (16; 116) are formed as a bent part.

11. The holding device (10) according to claim 1, characterized in that the foot section (16; 116) has two limbs (17a, 17b) that are at least partly elastically movable relative to each other.

12. The holding device (10; 110) according to claim 1, characterized in that the foot section (16; 116) has at least one of a guide surface (17a.1, 17b.1) and a contact surface (16a, 16b; 116a) respectively to support the support cheek (12a) on which the support cheek (12a) can be at least one of positioned and shifted in a pre-determined twisting angle relative to the foot section (16, 116).

13. The holding device (110) according to claim 1, characterized in that the foot section (116) has a U-shaped cross section and features two contact surfaces (116*a*) positioned opposite each other, on which a support cheek (12*b*) can be applied and positioned using surrounding edges (12*b*.1) relative to the foot section (116).

14. The holding device (110) according to claim 1, characterized in that the foot section (116) has a guide section (116.1) which is arranged on a contact surface (116*a*) and arranged to guide the connecting element (119) to position the head section (112) relative to the foot section (116).

15. The holding device (110) according to claim 1, characterized in that the connecting element (119) is guided in the foot section (116) in such a way that the holding device (110) is self-locking.

16. A system (1), comprising:
    at least one surface module (20);
    at least one support (30); and
    at least one holding device (10; 110), the at least one holding device comprising:
    a head section (12; 112) suited for interacting with the surface module (20);
    a foot section (16; 116) suited for interacting with the support (30);
    a connecting element (19; 119) that is suited for connecting the head section (12; 112) with the foot section (16; 116), with the head section (12; 112) being shiftable relative to the foot section (16; 116) along a vertical axis (H) of the holding device (10; 110) by means of the connecting element (19);
    characterized in that head section (12; 112) is configured to be mounted in at least two angle positions twisted towards each other around the vertical axis (H) in a pre-set (relative) twisting angle in such a way relative to the foot section (16; 116) that the head section is configured to be mounted in at least two of the angle positions respectively on one or more surface modules;
    characterized in that the head section (12; 112) has a support cheek (12*a*; 12*b*) that extends mainly in the direction of the vertical axis (H); and
    characterized in that the support cheek (12*a*; 12*b*) has a width (b2) that is smaller than a width (b1) of the head section (12; 112) in the corresponding direction.

17. A system (1), comprising:
    a head section (12; 112) suited for interacting with the surface module (20);
    a foot section (16; 116) suited for interacting with the support (30);
    a connecting element (19; 119) that is suited for connecting the head section (12; 112) with the foot section (16; 116), with the head section (12; 112) being shiftable relative to the foot section (16; 116) along a vertical axis (H) of the holding device (10; 110) by means of the connecting element (19);
    characterized in that head section (12; 112) is configured to be mounted in at least two angle positions twisted towards each other around the vertical axis (H) in a pre-set (relative) twisting angle in such a way relative to the foot section (16; 116) that the head section is configured to be mounted in at least two of the angle positions respectively on one or more surface modules; and
    characterized in that the holding device (10; 110) is connected to the at least one surface module (20) and the support (30) by the foot section (16; 116) of the holding device (10; 110) being positively connected to the support (30), and the head section (12; 112) being positioned on the at least one surface module (20).

18. The holding device of claim 5, wherein the width of the support cheek is at most two-thirds of the width of the head section.

19. The holding device of claim 5, wherein the width of the support cheek is greater than or equal to a width of the foot section in one area where the support cheek on the foot section makes contact.

* * * * *

UNITED STATES PATENT AND TRADEMARK OFFICE
CERTIFICATE OF CORRECTION

| | | |
|---|---|---|
| PATENT NO. | : 9,803,893 B2 | Page 1 of 1 |
| APPLICATION NO. | : 14/783013 | |
| DATED | : October 31, 2017 | |
| INVENTOR(S) | : Giraudo et al. | |

It is certified that error appears in the above-identified patent and that said Letters Patent is hereby corrected as shown below:

In the Applicant (71): Delete "RENUSOL GMBH" and insert -- RBI SOLAR, INC. --

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*